United States Patent
Borovikov et al.

(10) Patent No.: US 11,446,570 B2
(45) Date of Patent: Sep. 20, 2022

(54) AUTOMATED TEST MULTIPLEXING SYSTEM

(71) Applicant: Electronic Arts Inc., Redwood City, CA (US)

(72) Inventors: Igor Borovikov, Foster City, CA (US); Jesse Hans Stokes Harder, Redwood City, CA (US); Thomas Patrick O'Neill, Galway (IE); Jonathan Albert Rein, Belmont, CA (US); Avery H. Lee, Castro Valley, CA (US); Pawel Piotr Wrotek, San Mateo, CA (US); Graham Michael Parker, Montreal (CA); David Vincent, Montreal (CA)

(73) Assignee: Electronic Arts Inc., Redwood City, CA (US)

( * ) Notice: Subject to any disclaimer, the term of this patent is extended or adjusted under 35 U.S.C. 154(b) by 232 days.

(21) Appl. No.: 16/870,496

(22) Filed: May 8, 2020

(65) Prior Publication Data

US 2021/0346798 A1  Nov. 11, 2021

(51) Int. Cl.
*A63F 13/35* (2014.01)
*G06N 3/08* (2006.01)
*G06F 11/36* (2006.01)
*A63F 13/60* (2014.01)

(52) U.S. Cl.
CPC .............. *A63F 13/35* (2014.09); *A63F 13/60* (2014.09); *G06F 11/3608* (2013.01); *G06F 11/3664* (2013.01); *G06F 11/3684* (2013.01); *G06N 3/088* (2013.01)

(58) Field of Classification Search
None
See application file for complete search history.

(56) References Cited

U.S. PATENT DOCUMENTS

| | | |
|---|---|---|
| 8,719,791 B1 | 5/2014 | MacPherson et al. |
| 8,997,061 B1 | 3/2015 | Davison |
| 9,009,539 B1 | 4/2015 | Kompotis et al. |

(Continued)

OTHER PUBLICATIONS

Zalavadia, *How to use predictive analytics to optimize software delivery*, Mar. 21, 2017.

(Continued)

*Primary Examiner* — Ronald Laneau
(74) *Attorney, Agent, or Firm* — Knobbe, Martens, Olson & Bear, LLP

(57) ABSTRACT

An imitation learning system may learn how to play a video game based on user interactions by a tester or other user of the video game. The imitation learning system may develop an imitation learning model based, at least in part, on the tester's interaction with the video game and the corresponding state of the video game to determine or predict actions that may be performed when interacting with the video game. The imitation learning system may use the imitation learning model to control automated agents that can play additional instances of the video game. Further, as the user continues to interact with the video game during testing, the imitation learning model may continue to be updated. Thus, the interactions by the automated agents with the video game may, over time, almost mimic the interaction by the user enabling multiple tests of the video game to be performed simultaneously.

20 Claims, 12 Drawing Sheets

(56) References Cited

U.S. PATENT DOCUMENTS

| | | | |
|---|---|---|---|
| 9,245,117 | B2 | 1/2016 | Weaver et al. |
| 9,898,391 | B1 | 2/2018 | Morice et al. |
| 10,282,280 | B1 | 5/2019 | Gouskova et al. |
| 10,286,323 | B2 * | 5/2019 | Aghdaie ............... G06N 7/005 |
| 10,891,219 | B1 | 1/2021 | Dimitropoulos et al. |
| 10,940,393 | B2 * | 3/2021 | Somers ................ A63F 13/67 |
| 10,949,325 | B1 * | 3/2021 | Culibrk ................ A63F 13/70 |
| 11,179,644 | B2 | 11/2021 | Yen |
| 11,250,617 | B1 | 2/2022 | Sempe et al. |
| 2003/0005044 | A1 | 1/2003 | Miller et al. |
| 2003/0177187 | A1 | 9/2003 | Levine et al. |
| 2005/0138104 | A1 | 6/2005 | Houh et al. |
| 2005/0166115 | A1 | 7/2005 | Daume et al. |
| 2006/0253741 | A1 | 11/2006 | Garakani |
| 2007/0233497 | A1 | 10/2007 | Paek et al. |
| 2009/0027402 | A1 | 1/2009 | Bakalash et al. |
| 2009/0070746 | A1 | 3/2009 | Dhurjati et al. |
| 2009/0113251 | A1 | 4/2009 | Goossen et al. |
| 2009/0113303 | A1 | 4/2009 | Goossen et al. |
| 2010/0115496 | A1 | 5/2010 | Amichai |
| 2010/0144443 | A1 | 6/2010 | Graham |
| 2010/0144444 | A1 | 6/2010 | Graham |
| 2012/0204153 | A1 | 8/2012 | Peterson et al. |
| 2012/0209571 | A1 | 8/2012 | Peterson et al. |
| 2012/0311387 | A1 | 12/2012 | Santhosh et al. |
| 2013/0205286 | A1 | 8/2013 | Barraclough et al. |
| 2014/0085314 | A1 | 3/2014 | Steinke |
| 2014/0300491 | A1 * | 10/2014 | Chen ...................... H04L 67/10 340/870.07 |
| 2016/0041894 | A1 | 2/2016 | Reid, III et al. |
| 2016/0179659 | A1 | 6/2016 | Champlin-Scharff et al. |
| 2016/0262680 | A1 | 9/2016 | Martucci et al. |
| 2016/0283353 | A1 | 9/2016 | Owen et al. |
| 2016/0292065 | A1 | 10/2016 | Thangamani et al. |
| 2017/0123961 | A1 | 5/2017 | Cerny et al. |
| 2017/0147470 | A1 | 5/2017 | Bloching et al. |
| 2017/0201779 | A1 | 7/2017 | Publicover et al. |
| 2017/0230417 | A1 | 8/2017 | Amar et al. |
| 2017/0233497 | A1 | 8/2017 | Labrijn et al. |
| 2017/0242780 | A1 | 8/2017 | Arbel |
| 2017/0259177 | A1 | 9/2017 | Aghdaie et al. |
| 2017/0322917 | A1 | 11/2017 | Goyal et al. |
| 2017/0339037 | A1 | 11/2017 | Cheh et al. |
| 2018/0165723 | A1 | 6/2018 | Wright et al. |
| 2018/0275989 | A1 | 9/2018 | Kakkad et al. |
| 2018/0293158 | A1 | 10/2018 | Baughman et al. |
| 2020/0089594 | A1 | 3/2020 | Zhou et al. |
| 2020/0159644 | A1 | 5/2020 | Beltran et al. |
| 2020/0334228 | A1 | 10/2020 | Matyska et al. |
| 2021/0366183 | A1 | 11/2021 | Gisslen et al. |

OTHER PUBLICATIONS

Zhao, et al., *Winning Isn't Everything: Enhancing Game Development with Intelligent Agents*, Aug. 20, 2019.

Borovikov, et al., *Towards a Representative Metric of Behavior Style in Imitation and Reinforcement Learning*, 23$^{rd}$ Annual Signal and Image Sciences Workshop at Lawrence Livermore National Laboratory (LLNL), Center for Advanced Signal Image Sciences (CASIS). May 15, 2019.

Borovikov, et al., *Imitation Learning via Bootstrapped Demonstrations in an Open-World Video Game*, Dec. 2018.

Borovikov, et al., *Towards Interactive Training of Non-Player Characters in Video Games*, Jun. 3, 2019.

Borovikov, et al., *Towards Interactive Training of Non-Player Characters in Video Games*, Presentation Slides, Jun. 14, 2019.

Borovikov, et al., *From Demonstrations and Knowledge Engineering to a DNN Agent in a Modern Open-World Video Game*, Presentation Slides, 2019.

Borovikov, et al., *From Demonstrations and Knowledge Engineering to a DNN Agent in a Modern Open-World Video Game*, Published Apr. 26, 2019.

\* cited by examiner

AUTOMATED TEST MULTIPLEXING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Many video games are complex software applications that utilize a significant percentage of a computer system's resources. Each year the complexity of many of the latest video games pushes the boundaries of the latest computing systems. Modern video games comprise millions of lines of code. Testing the code of such large applications can be a time consuming and challenging process. Further, because video games are often programmed by teams of developers, changes made by one developer or team of developers working on one portion of the video game may impact code developed by another developer or team of developers working on another portion of the video game. Ensuring that a video game operates as desired can be particularly challenging when the video game is composed of different modules, which may be created independently, that are configured to operate together to create a single video game or application. Thus, code must often be tested and retested repeatedly as changes are made to the code by different teams.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

Certain aspects of the present disclosure relate to a computer-implemented method. The method may be implemented by an interactive computing system configured with specific computer-executable instructions. The method may include: accessing an imitation learning model of a video game under test, the imitation learning model generated at a first time based on a set of user interactions with a user-controlled instance of the video game; and for each of a set of agent-controlled instances of the video game: receiving first state information at a second time for the agent-controlled instance of the video game, wherein the second time is later than the first time; applying the first state information to the imitation learning model to obtain a first simulated user action; and causing an imitation learning (IL) agent to perform the first simulated user action with respect to the agent-controlled instance of the video game, wherein the first state information for at least one of the set of agent-controlled instances of the video game differs from the first state information for at least one other of the set of agent-controlled instances of the video game.

The method of the preceding paragraph can include any combination or sub-combination of the following features: where the method further includes: receiving an indication of a user action performed with respect to the user-controlled instance of the video game; and modifying the imitation learning model of the video game based at least in part on the indication of the user action to obtain an updated imitation learning model; where the user action is performed subsequent to the set of user interactions used to generate the imitation learning model; where the method further includes, for each of the set of agent-controlled instances of the video game: receiving second state information at a third time for the agent-controlled instance of the video game, wherein the third time is later than the second time; applying the second state information to the updated imitation learning model to obtain a second simulated user action; and causing the imitation learning agent to perform the second simulated user action with respect to the agent-controlled instance of the video game; where the method further includes receiving state information for the user-controlled instance of the video game, wherein the imitation learning model of the video game is modified based at least in part on the indication of the user action and the state information; where the state information comprises pre-state information corresponding to the state of the user-controlled instance of the video game prior to performance of the user action, post-state information corresponding to the state of the user-controlled instance of the video game after performance of the user action, or both pre-state information and post-state information; where the method further includes receiving a weighting associated with the user action, wherein the modifying of the imitation learning model to obtain the updated imitation learning model is based at least in part on the indication of the user action and the weighting associated with the user action; where the set of agent-controlled instances of the video game comprises one or more instances of the video game; where the method further includes, upon detecting a trigger condition at an agent-controlled instance of the video game of the set of agent-controlled instances of the video game, performing a remediation action; where the remediation action comprises providing control of the agent-controlled instance of the video game to a user; where the remediation action comprises modifying a weighting of a state within the imitation learning model; and where the trigger condition comprises: a threshold number of occurrences of a video game state, an error, or an occurrence of an unexpected state, wherein the unexpected state comprises a state not included in the imitation learning model.

Additional aspects of the present disclosure relate to a system comprising an electronic data store configured to store an imitation learning model generated based on a set of user interactions with a user-controlled instance of a video game; and a hardware processor of a test system in communication with the electronic data store. The hardware processor configured to execute specific computer-executable instructions to at least: access the imitation learning model of the video game from the electronic data store; receive first state information for an agent-controlled instance of the video game; apply the first state information to the imitation learning model to obtain a first simulated user action; and provide the first simulated action to an imitation learning agent configured to test the agent-controlled instance of the video game, wherein the imitation learning model comprises a dynamically generated imitation learning model that is updated during execution of the agent-controlled instance of the video game based on a user interaction with the user-controlled instance of the video game.

The system of the preceding paragraph can include any combination or sub-combination of the following features: where the test system is configured to host the agent-controlled instance of the video game and the imitation learning agent; where the hardware processor is further configured to execute specific computer-executable instructions to at least: receive an updated imitation learning model; receive second state information for the agent-controlled instance of the video game, wherein the second state information is received later than the first state information; apply the second state information to the updated imitation learning model to obtain a second simulated user action; and provide the second simulated user action to the imitation learning agent to perform the second simulated user action with respect to the agent-controlled instance of the video game; where the imitation learning agent is hosted by an imitation learning client comprising computer hardware that is separate from the test system, the imitation learning client configured to host the agent-controlled instance of the video game; where the hardware processor is further configured to execute specific computer-executable instructions to at least: receive an indication of the user interaction performed with respect to the user-controlled instance of the video game; and modify the imitation learning model of the video game based at least in part on the indication of the user interaction to obtain an updated imitation learning model; where the hardware processor is further configured to execute specific computer-executable instructions to at least: receive second state information for the agent-controlled instance of the video game, wherein the second state information is received later than the first state information; apply the second state information to the updated imitation learning model to obtain a second simulated user action; and provide the second simulated user action to the imitation learning agent to perform the second simulated user action with respect to the agent-controlled instance of the video game; where the hardware processor is further configured to execute specific computer-executable instructions to at least: detect a trigger condition at the agent-controlled instance of the video game; pause execution of the agent-controlled instance of the video game; and prompt a user to assume control of the agent-controlled instance of the video game; and where the hardware processor is further configured to execute specific computer-executable instructions to at least modify the imitation learning model of the video game based at least in part on user interaction with the agent-controlled instance of the video game.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Introduction

Figure 1:
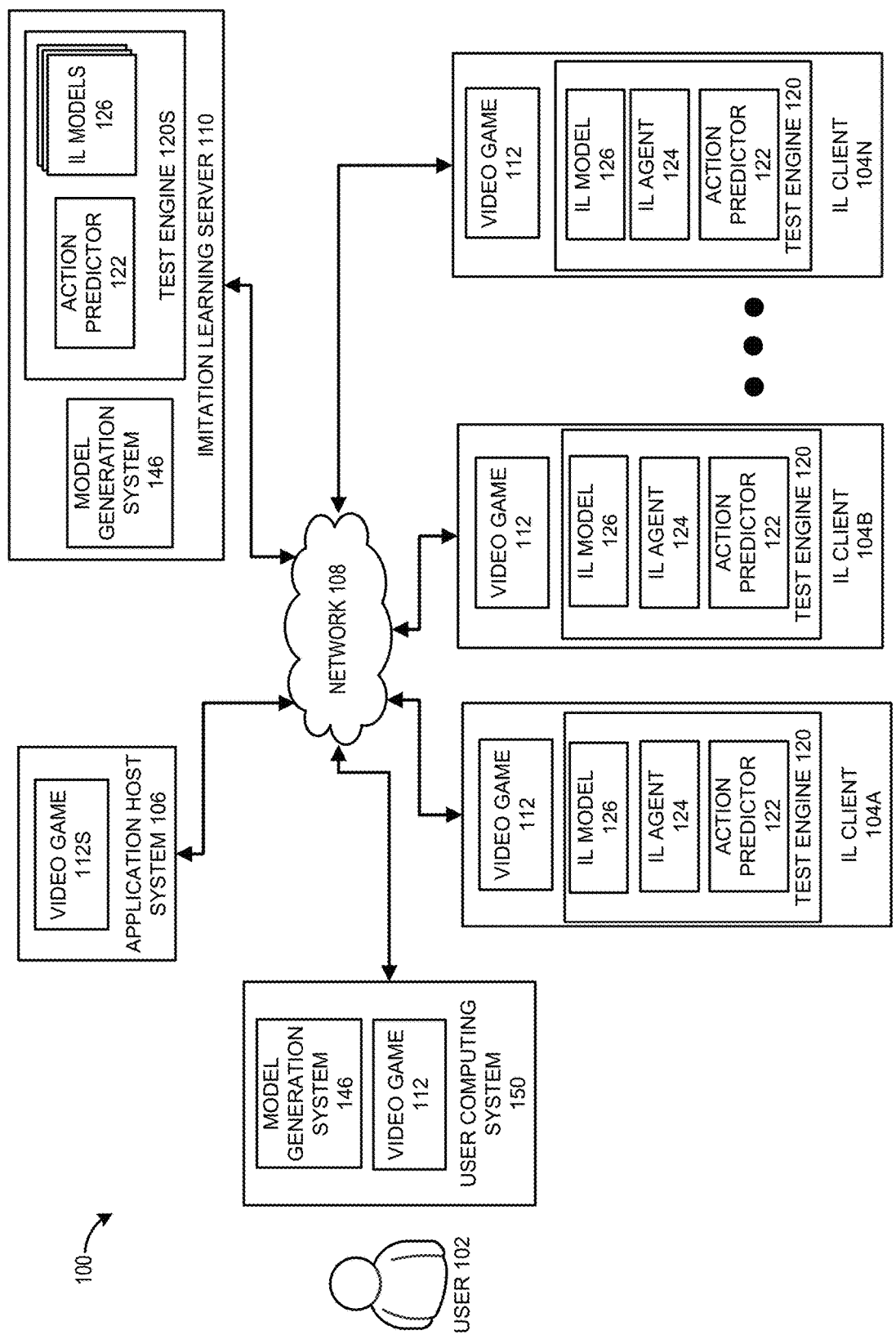
FIG. 1 illustrates aspects of a networked computing environment that can implement one or more aspects of an imitation learning system or an automated test multiplexing system.

Testing large applications, such as modern video games can be complex and time-consuming. Part of testing video games includes testing different actions that users can perform when playing the video game. With many complex video games, the number of different types of actions that users can perform and the number of sequences in which the actions can be performed when playing the video game is immense. Even some relatively simple video games may have a large number of potential actions that can be performed while playing the video game.

Further, many modern video games use some degree of randomness or pseudo-randomness that can exponentially increase the number of possible ways to play the game or the number of possible game states. Due, for example, to the randomness of certain elements of some video games, it can be difficult to repeatedly test some aspect of some video games. Thus, it is often the case that a video game or a portion of a video game is tested a multitude of times (e.g., hundreds, thousands, or more times) to, for example, recreate a particular state (e.g., a bug, a crash, or to confirm changes to the code of the video game have not inadvertently introduced errors).

The complexity of video games and the large amount of testing required to fully test many video games often requires a large number of testers (e.g., 20, 50, or hundreds of testers) and a large number of test machines. In some cases, testers may focus on a particular portion of a video game for a period of time to try and recreate certain conditions. For example, 10-20 testers may work for a week on one portion of a video game testing one or more conditions of the video game. Moreover, the amount of time required to test the video game may be equal to, or in some cases longer, than the amount of time required to play the game. For example, if the portion of the video game to be tested occurs ten hours into playing the game, then a tester may spend up to ten hours playing the video game to reach the portion of the video game to be tested. If the video game is challenging, the user may spend more than ten hours reaching the part of the video game to be tested because, for example, the user struggles to complete an earlier portion of the video game delaying the length of testing time.

Further, to support different types of computing machines (e.g., desktops, laptops, smartphones, or video game systems (e.g., Nintendo Switch®, Microsoft® Xbox One®, or Sony® PlayStation®)), it is sometimes necessary to test the video game on different machines. In some cases, testing the video game can use a large percentage of the overall budget for developing the video game. For example, in some cases, the test budget may be 20-25% of the total budget, if not more.

One method of reducing overhead relating to testing is to prepare test scripts that can perform actions with respect to an instance of the video game on behalf of a tester. However, test scripts can often not account for differences across instances of the video game relating, for example, to different user-selected game options, or to random or pseudo-random elements within the video game. Further, in some cases, generating the test scripts can be almost as time consuming as performing the tests themselves because a tester or other user must manually determine each action to be performed during test and write an entry within the script to perform the action. Errors in creating the script can result in wasted resources or improper test results. Further, changes to the video game that occurs during development of the game may require changes to the test scripts. In some cases, using a test script may waste more time than it saves because of, for example, changes required to test scripts and errors in developing test scripts as the video game is developed.

Aspects of the present disclosure reduce the amount of time and resources required to test a video game, or other application, by using an imitation learning system to learn how to play the video game based on user interactions by a tester or other user of the video game. The imitation learning system may develop an imitation learning model based, at least in part, on the tester's interaction with the video game and the corresponding state of the video game to determine or predict actions that may be performed when interacting with the video game. The imitation learning system may use the imitation learning model to control one or more automated agents that can play additional instances of the video game. Further, as the user continues to interact with the video game during testing, the imitation learning model may continue to be updated. Thus, the interactions by the automated agents with the video game may, over time, almost mimic the interaction by the user. In other words, the selection of actions by the one or more automated agents may converge over time with the selection of actions by the user. It should be understood that the selection of actions by the automated agents may still not be identical to the actions selected by the users because, for example, random aspects of the video game creating different states among different instances of the game. In some cases, the automated agent interaction and the user interaction with the video game may be identical.

Although desirable in some cases, it may be undesirable for the automated agents to identically mimic the user or human tester because, for example, the states of each instance of the video game may differ due to, for example, random or pseudo-random elements of the video game. As another example, the states of each instance of the video game may differ due to differences in initial conditions of the instances of the video game, or of initial conditions of levels within the instances of the video game. For instance, the different initial conditions may include different characters may be selected, different starting points within a level may be selected (by a user or the video game code), different starting items may be selected, or any other user-selected or video game selected initial condition that can vary across instances of the video game. In cases where the video game includes a shared world (persistent or otherwise), every instance of the video game may position playable characters in different positions. In other words, some video games may not permit two playable characters to being in the same location. Accordingly, as each automated agent may be positioned in a different location of a multiplayer game, it may be desirable for the automated agents to perform similarly as the human tester, but not to mimic the human tester identically due to differences in the initial condition of the characters controlled by the automated agents. Further, having automated agents identically mimic the user may reduce the amount of variance in testing performed over a given time period. It is often desirable for testing to vary in order to test different aspects of the video game, the same portion of the video game under different conditions, or the performance of different actions with respect to a portion or state of the video game.

In some implementations, to reduce or prevent the automated agents from identically mimicking the user, the imitation learning system may combine both the user interaction and the video game state when generating the imitation learning model. Further, when determining or predicting the actions to be performed by the automated agent, the state of the video game controlled by the automated agent may be considered. Thus, differences in game state may result in different actions be performed by the automated agent. Over time, the automated agent's actions may imitate the user's actions, but may not be identical due, for example, to video game state differences. Thus, more states of the video game may be tested over time without requiring multiple human users to test the video game. Further, the amount of tests performed by a human user may be reduced while performing the same number or a greater number of test cases.

In some aspects of the present disclosure, the imitation learning system may generate the imitation learning model using one or more machine learning algorithms. For example, the imitation learning model may be a Markov model. Further, the imitation learning system may weight different states within the imitation learning model or different user actions that are performed in generating the imitation learning model to cause certain actions to be performed more frequently or by more automated agents. Thus, it is possible for testing to be directed towards portions of the video game that may be played more, that are more likely to have errors, or for any other reason that a developer or tester has determined that a portion of the video game needs more extensive testing.

To simplify discussion, the present disclosure is primarily described with respect to a video game. However, the present disclosure is not limited as such and may be applied to other types of applications. For example, embodiments disclosed herein may be applied to educational applications (for example, applications that help users learn a new language) or other applications where many users may simultaneously access the application or where the number of possible actions that a user may perform can be large, such as hundreds, thousands, tens of thousands, some range between the foregoing, or more.

Example Networked Computing Environment

FIG. 1 illustrates aspects of a networked computing environment 100 that can implement one or more aspects of an imitation learning system or an automated test multiplexing system that can use one or more automated agents to test one or more instances of a video game without a human user (e.g., a video game tester or a video game developer) interacting with the one or more instance of the video game. Thus, the one or more automated agents can simulate a number of testers testing the video game under test.

The networked computing environment 100 may be configured to test a video game 112. The video game 112 may include any type of video game that is playable on any type of computing device. Further, the video game 112 may be hosted by a client computing device, such as the user computing system 150. Alternatively, the video game 112 may be hosted by a server, such as a game server or a web server. In some cases, the video game may be partially hosted by a client and partially hosted by a server. For example, the video game 112 may be a game that includes a persistent world. In some such cases, a portion of the video game 112 may be hosted by a client (e.g., the user computing system 150) and a portion of video game 112 may be hosted by a server (e.g., the application host system 106).

The networked computing environment 100 may include a user computing system 150 and a set of one or more imitation learning (IL) clients 104A, 104B, 104N (which may individually be referred to as "IL client 104" or collectively referred to as "IL clients 104"). The user computing system 150 may include an instance of the video game 112 with which a user 102 may interact. This user 102 may be a tester, a developer, or any other user that may play an instance of the video game 112 under test. The IL clients 104 may each host separate instances of the video game 112 under test. Although the IL clients 104 may host separate instances of the video game 112, in some cases, at least some of the instances of the video game 112 may interact with each other (e.g., as part of a multiplayer game) or may interact with the same instance of a persistent world, such as the video game 112S hosted by the application host system 106.

While the user 102 may interact (or play) with the video game 112 hosted by the user computing system 150, the instances of the video game 112 hosted by the IL clients 104 may be controlled, interacted with, or otherwise played by an IL agent 124. As will be described further below, in some cases, the user 102 may interact with an instance of the video game 112 hosted by an IL agent 104. Further, in some cases, the user computing system 150 can be or may serve as an IL client 104 and vice versa.

In some cases, the user 102 and the IL agents 124 may interact with their respective instances of the video game 112 at least partially in parallel. As is described in more detail below, the interactions by the user 102 with the video game 112 at the user computing system 150 may be the basis of or may influence the actions performed by the IL agents 124 of the IL clients 104 with respect to the instances of the video game 112 hosted by the IL clients 104. For example, as the user 102 interacts with the video game 112, the IL agent 124 may attempt to imitate the user 102's actions with respect to the video game 112 enabling multiple tests to be conducted of the video game 112 at least partially in parallel without additional users to perform the tests.

The networked computing environment 100 may include an imitation learning server 110 that can facilitate testing the video game 112. The imitation learning server 110 may include a test engine 120S and a model generation system 146. The model generation system 146 can generate one or more imitation learning (IL) models 126. The IL models 126 may include or may be parameter models or prediction models. The model generation system 146 may generate the IL models 126 by applying indications of user interactions with the video game 112 to one or more machine learning algorithms. For example, the indications of user interactions may be used to generate a Markov model. Further, the model generation system 146 may use information associated with one or more corresponding states of the video game 112 occurring before, during, and/or after the user 102's interaction with the video game 112 to generate the IL models 126.

A user 102 may interact with an instance of the video game 112 at the user computing system 150. The identification of the user interactions with the video game 112 and/or corresponding state information for the video game 112 may be received from the user computing system 150 via the network 108. The model generation system 146 of the IL server 110 may generate or update an IL model 126 based on the received user interaction information and/or state information. Alternatively, or in addition, the model generation system 146 may be hosted at the use computing system 150. In some such cases, the model generation system 146 may generate the IL model 126 at the user computing system 150. The IL model 126 may then be provided to the IL server 110 and/or to one or more IL clients 104.

The IL models 126 may be stored at an electronic storage device of the imitation learning server 110, or at a separate storage device or repository (not shown) that is accessible by the imitation learning server 110. Alternatively, or in addition, the IL models 126 may be stored at the user computing system 150 and/or at one or more IL clients 104.

The test engine 120S may include an action predictor 122. The action predictor 122 may use the IL models 126 to determine or predict an action to be performed with respect to an instance of the video game 112 under test. These IL models 126 may be used by an action predictor 122 to determine or predict an action that can be performed by an imitation learning (IL) agent 124 with respect to an instance of the video game 112. The IL server 110 can provide an indication of the action to be performed by the IL agent 124 to an IL client 104 over the network 108.

In some implementations, the IL models 126 may be provided to the IL clients 104 by the imitation learning server 110. In some such implementations, the action predictor 122 may be part of a test engine 120 hosted by the IL clients 104. The test engine 120 of the IL clients 104 may include the action predictor 122 that can determine or predict an action for the IL agent 124 to perform at the video game 112 hosted by the IL client 104 based on a state of the video game 112. In embodiments where the model generation system 146 is hosted by the user computing system 150 and the test engine 120 is hosted by the IL clients 104, the IL server 110 may be optional or omitted. Although it is possible to eliminate the IL server 110 in some cases, generally it is desirable to maintain the IL server 110. For example, it may be desirable to have the model generation system 146 hosted by the IL server 110 in some cases, to enable the IL model 126 to be generated or modified based on actions with respect to multiple instances of the video game 112 hosted as multiple systems (e.g., one or more IL clients 104, or the user computing system 150 and one or more IL clients 104). Further, in some cases, it is desirable to have the IL server 110 determine actions to be performed by the IL agents 124 because, for example, the IL clients 104 may, in some cases, not be able to support operation of the action predictor 122. For instance, for IL clients 104 that are implemented as video game systems, it may not be possible to load non-video game applications onto the IL client 104 or to have the IL client 104 perform all the actions of the test engine 120S.

The IL clients 104 may include, in addition to an instance of the video game 112, a test engine 120. The test engine 120 may include one or more of an action predictor 122, an IL agent 124, and/or an IL model 126. The action predictor 122 may, like the action predictor 122 of the IL server 110, use an IL model 126 to determine or predict an action to be performed with respect to the instance of the video game 112 at the IL client 104, or with which the IL client 104 communicates. The IL model 126 may be generated by the model generation system 146 of the user computing system 150 or the model generation system 146 of the IL server 110. In implementations where an action predictor 122 exists at the test engine 120 of the IL client 104, the IL model may be provided to the IL client 104 and stored at a storage (not shown) of the IL client 104.

Further, the test engine 120 of the IL client 104 includes an IL agent 124. The IL agent 124 may perform an action with respect to the video game 112 and/or the video game 112S. This action may be determined or predicted by the action predictor 122 of the test engine 120 or the action predictor 122 of the test engine 120S. In some cases, the test engine 120 may alert a user of a result of the performance of an action. This result may be a particular state of the video game 112 (or video game 112S). For example, the state may be a crash state, an occurrence of a bug, or the occurrence of an event within the video game 112 and/or the video game 112S.

Although not illustrated, in some implementations, the application host system 106 may include a test engine 120 that may be used to test an instance of the video game 112S or a server portion of a video game 112S. Further, in some cases, a test engine 120 may test an instance of a client portion of the video game 112 executing on an IL client 104 while a test engine on the application host system 106 is used to test an instance of a server portion of the video game 112 (e.g., a video game 112S). In some cases, the same test engine 120 may be used to test both a client and a sever portion of a video game 112.

User computing system 150 may include or host a video game 112. In some cases, the video game 112 may execute entirely on the user computing system 150. In other cases, the video game 112 may execute at least partially on the user computing system 150 and at least partially on the application host system 106 (e.g., the video game 112S). In some cases, the video game 112 (e.g., the video game 112S) may execute entirely on the application host system 106, but a user may interact with the video game via the user computing system 150. For example, the game may be a massively multiplayer online role-playing game (MMORPG) that includes a client portion executed by the user computing system 150 and a server portion executed by one or more application host systems 106. As another example, the video game 112 may be an adventure game played on the user computing system 150 without interacting with the application host system 106.

The user computing system 150 may include hardware and software components for establishing communications over a communication network 108. For example, the user computing system 150 may be equipped with networking equipment and network software applications (for example, a web browser) that facilitate communications via a network (for example, the Internet) or an intranet. The user computing system 150 may have varied local computing resources, such as central processing units and architectures, memory, mass storage, graphics processing units, communication network availability and bandwidth, and so forth. Further, the user computing system 150 may include any type of computing system. For example, the user computing system 150 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 150 may include one or more of the embodiments described below with respect to FIGS. 7 and 8.

The IL clients 104 may each include one or more of the embodiments described with respect to the user computing system 150, and vice versa. Further, some of the IL clients 104 may be configured differently than the user computing system 150 or differently from each other. For example, some IL clients 104 may be laptops and some IL clients 104 may be video game systems. As another example, some IL clients 104 may be executing Windows® operating system, some IL clients 104 may be executing a macOS® operating system, and some IL clients 104 may be executing a Linux® operating system.

As previously described, the model generation system 146 can use one or more machine learning algorithms to generate one or more IL models 126. One or more of these IL models 126 may be used to determine an expected value or occurrence based on a set of inputs. For example, an IL model 126 can be used to determine an expected action that a user 102 might perform with respect to an instance of the video game 112 based on one or more inputs to the IL model 126. Using the prediction, an IL agent 126 can perform the action on behalf of the user 102 enabling the automated testing of the video game 112. A number of different types of algorithms or models may be used by the model generation system 146 to generate the IL models 126. For example, the model generation system 146 may generate a Markov model.

The Markov model, which is one example of a model that can be used for the IL models 126, can be constructed using a combination of the state of the video game and the action performed by the user 102 when interacting with the video game 112. In some cases, the data used to generate the Markov model can be obtained continuously (e.g., for each frame output by the video game 112). In other cases, it is obtained intermittently or regularly on a scheduled basis. For example, the data may be obtained each half second, each second, each five seconds, etc. In some cases, the time refers to in-game time, and the data is obtained regularly as game within the video game progresses. Thus, if the game is paused, or no action is occurring in the video game, data may not be obtained or the time between samples may pause.

Each time point during which the state of the video game and the action performed by the user is obtained may be referred to as a sample period, a sample point, or a sample time. During each sample time, the gameplay of the video game 112 may be characterized by the game state and the action, or interaction, taken by the user 102 with respect to the video game 112. The state of the video game 112 may be in a vector form that describes the state of elements of the video game 112 including playable characters, non-playable characters, and environmental features, among other aspect of the video game 112. For example, the state vector may include a location of a playable character, a state of the playable character, such as health, ammunition, whether climbing or standing on the ground, discrete flags for lines of sight, etc. Similar information may be included for non-playable characters within the state vector.

Some variables included as part of the state vector may be binary or may include one of a particular set of values (e.g., one of five values). Other variables may include a value from a range of values (e.g., a value between 1 and a 100), and in some cases, may include fractional values. In some cases, the process of generated the Markov model may include quantizing the continuous variables. Two non-limiting examples of continuous variables may include a playable (or non-playable) character's health and a relative distance between a character and a nearest point of interest (e.g., an adversary, an NPC, a level transition point, etc.). In the example of a health variable, quantization may happen at several levels of detail (LoD). In some cases, the coarsest LoD maps the entire range of the health variable to two discrete values, such as "has health" and "out of health." A more detailed quantization could map the LoD to three levels, such as "full health", "half health" and "out of health." In some cases, the three discrete values, or some other quantization level, may be set as the coarsest LoD. The health variable can continue to be mapped to higher and higher quantization levels up to a particular maximum that may be used as the most fine-grained LoD. For example, the highest LoD could be set at a 100 step subdivision of the entire health range value allowing for more fine-grained decision making compared to the crudest permitted LoD. The LoDs can be computed using thresholds that approximately correspond to the video game 112 logic thresholds. For example, if health equals "half health", then the system may send the character to a cover spot or to an appropriate medipack until the full health is restored. But, if health equals "full health," then the system may have the character strafe the enemy. The values and the number of the thresholds used in quantization can be engineered or learned by meta-parameters search that attempts to optimize the character performance with respect to the game testing metrics, such as to maximize survival time in the environment, to maximize a kill-to-death ratio, or to maximize the number of in-game coins collected.

Another example of quantization is with respect to the relative distance between two points in the video game 112 environment. For example, the relative distance between the playable character and an adversary (or other object of interest). Like with the case of the health variable, we can consider the lowest LoD consisting of only two discrete values "no adversary on the level" and "there is an adversary". Then, we can subdivide the actual distance range according to the sensing and weapons mechanics of the character and/or the character's weapon. The thresholds can divide the entire range into sub-ranges like "too far to care" (the distance is too far for being detected or to engage with the adversary using ranged weapons), "the adversary can sense the character but can't shoot", "the adversary can reliably shoot the character", "the distance is short enough for hand-to-hand combat", etc. As with the previous example, the LoDs for this case can be engineered using the game tuning values or can be learned using a meta-parameters search. The list of examples can continue with angles (lowest level of details is "in field of view" or "outside of field of view" all the way down to the fine-grained angles allowing to shoot or attack smaller sub-parts of an adversary).

Thus, quantization in the context of the present disclosure and in the context of general information-theory may include mapping continuous variables into a discrete domain by thresholding the values. The thresholds can be uniform, non-uniform, engineered, or learned. Further, the quantization process can be applied to any continuous domain with respect to the video game 112. For example, the quantization process can be applied in a temporal domain (e.g., the system samples states or measures time with a particular frequency), a spatial domain (e.g., based on distances, velocity, angles, etc.), or in a particular attribute domain (e.g., health, stamina, destruction level of an object, etc.). The quantization can be used to convert an intractable space into a discrete alphabet allowing the manipulation of states and actions as words in a language following the general Markov logic, or as part of a Markov model.

Quantizing the continuous variables by obtaining the state information at regular intervals, in the state vector allows them to be converted into a discrete "alphabet" comprising keys of the Markov model. Using different quantization levels, we can obtain alphabets of a various resolution or "level of details." The Markov model can map the current state of the video game 112 with a history of previous player actions by the user 102 to the next action which we expect the user 102 to take. If the Markov model at the current level of resolution misses the corresponding entry (e.g., fails to produce a prediction for the next action to be performed by the user 102, or a hypothetical user playing similarly to the user 102), we can decrease the model resolution (or switch to a course level of details) and consult the less detailed Markov model. This process can be repeated until we reach the lowest resolution model. The selected model can return the next action by sampling actions taken by the user 102 in the past. As such, in some cases, the model constructed in this manner always returns a prediction, with its quality deteriorating as we are consulting more coarse levels of the game state/action representation. However, the described Markov model is only an example of the method where observed previous actions can be used for generating a prediction and, as such, can provide a replacement of the user interacting with the video game 112.

Although a Markov model was used during implementation of a proof of concept, it should be understood that other models and machine learning algorithms are possible. In other words, the use of a Markov model is just one possible example of the implementation of an imitation learning algorithm. Other implementations are possible. For example, certain embodiments herein may use a logistical regression algorithm, a linear regression algorithm, a discrete choice algorithm, or a generalized linear algorithm.

The machine learning algorithms can be configured to adaptively develop and update the models over time based on new input received by the model generation system 146. For example, the models can be regenerated or updated on a periodic basis as additional interactions by the user 102 with the video game 112 on the user computing system 150 become available. The model generation system 146 is described in more detail herein. After a model is generated, it can be provided to the test engine 120S or the test engines 120.

Some non-limiting examples of machine learning algorithms that can be used to generate and update the parameter functions or prediction models (e.g., the IL models 126) can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The network 108 can include any type of communication network. For example, the network 108 can include one or more of a wide area network (WAN), a local area network (LAN), a cellular network, an ad hoc network, a satellite network, a wired network, a wireless network, and so forth. Further, in some cases, the network 108 can include the Internet.

Example Imitation Learning Process

Figure 2:
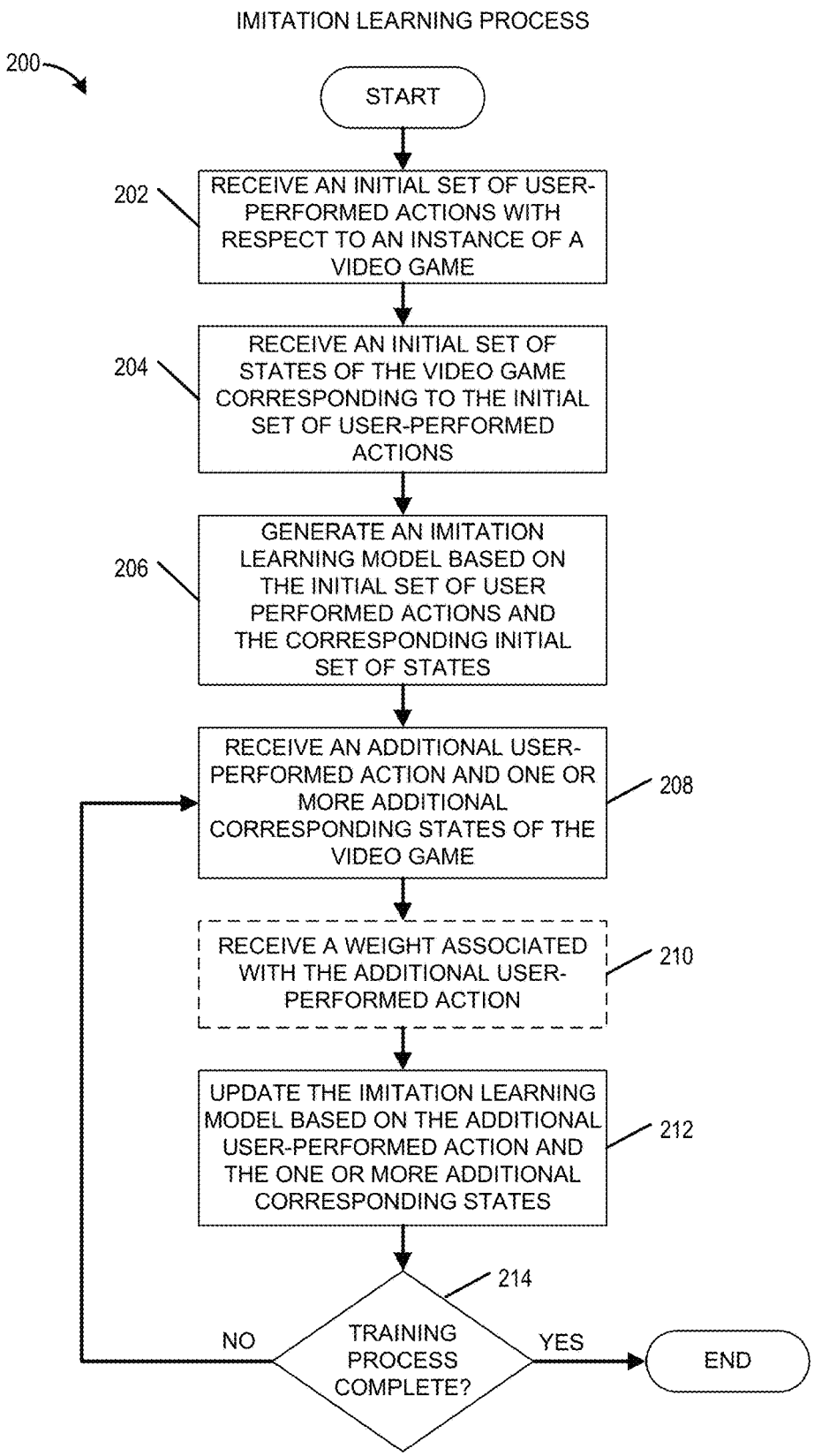
FIG. 2 presents a flowchart of an embodiment of an imitation learning process in accordance with certain aspects of the present disclosure.

FIG. 2 presents a flowchart of an embodiment of an imitation learning process 200 in accordance with certain aspects of the present disclosure. The process 200 can be implemented by any system that can generate a model (e.g., an IL model 126) for identically or non-identically imitating user interactions with a video game 112. The process 200, in whole or in part, can be implemented by, for example, a model generation system 146 (at either the IL server 110 or the user computing system 150), a test engine 120S, or an IL server 110, among others. Although any number of systems, in whole or in part, can implement the process 200, to simplify discussion the process 200 will be described with respect to particular systems.

The process 200 may be performed at any time and with respect to a user 102's interactions with respect to an instance of the video game 112 hosted by the user computing system 150 and/or the video game 112S hosted by the application host system 106. In some cases, the process 200 may be performed with respect to a user's interaction with an instance of the video game 112 hosted by one or more IL clients 104. For example, as will be discussed further herein, a user 102 may take control of a playable character in the video game 112 from an IL agent 124 of an IL client 104. In some such cases, one or more operations of the process 200 may be performed based on the user's interactions with the video game 112 hosted by the IL client 104.

The process 200 may begin upon an instance of the video game 112 being loaded or executed by a user computing system 150. Alternatively, or in addition, the process 200 may begin after execution of the video game 112 reaches a particular point. For example, the process 200 may begin after character selection or configuration, option selections, a playable character reaching a particular point in the game, a particular event occurring, or any other triggering event. In some cases, the triggering event is automatic. In other cases, the triggering event is based on a command by a user. In some cases, a script is used to cause the video game 112 to reach a particular point (for example, the start of game play after option and character selection). In some cases, the completion of the script may serve as a trigger that causes the process 200 to begin.

The process begins at block 202 where the IL server 110 receives an initial set of user-performed actions with respect to an instance of a video game 112. Receiving the initial set of user-performed actions may include receiving an indication for each of the user-performed actions included in the set of user-performed actions. The initial set of user actions may be performed as part of a user 102 testing the instance of the video game 112. Alternatively, or in addition, the initial set of user actions may be performed to provide training data to the model generation system 146 to generate an IL model 126.

The user-performed actions may include any type of action or user-interaction that may be performed with respect to the video game 112. Further, the user-performed actions may be performed with any type of user-interface device supported by the video game 112. In some cases, the user-performed actions may include not performing an action at a certain point in the game or for a certain period of time. It may be desirable, in some cases, for the user-performed action to be no action to test the impact of environment changes or non-player character (NPC) actions when the user performs no action. For example, a tester may want to test how a the video game 112 responds when a user does not attempt to avoid an enemy, does not attempt to kick a ball passed to the playable character controlled by the user, or does not avoid a falling object within the video game environment. The user-performed actions may include actions that successfully complete an objective (e.g., kill an enemy, collect coins, score a goal, etc.) and actions that fail to successfully complete an objective (e.g., jumping into an enemy bullet, ducking under a coin, selecting an incorrect response option to an NPC speech prompt, etc.).

At block 204, the IL server 110 receives an initial set of states of the video game 112 corresponding to the initial set of user-performed actions received at the block 202. The initial set of states may include a state of the instance of the video game 112 prior to the performance of each user action included in the set of user actions and/or a state of the instance of the video game 112 after the performance of each user action included in the set of users actions. Thus, for each user-performed action performed with respect to the instance of the video game 112, data associated with the state of the instance of the video-game 112 before, after, or both before and after performance of the action may be provided as part of the block 204.

Receiving the initial set of states may include receiving information (which may be referred to as state information) that defines or is otherwise based on each of the set of states of the video game 112. For example, the state information may include values for one or more variables or configuration settings of the video game 112, values for one or more metrics associated with characters (both playable and non-playable) within the video game 112, or any other data that may be indicative of execution state of the video game 112. Further, state information may include the execution status of the video game 112, computing resource usage, or any other information that may be indicate IL client's 104 execution of the video game 112 or that may be useful in determining whether source code for the video game 112 is executing as intended by a developer or without error. In some cases, the state information may include a subset of the state information or data for the video game 112. For example, in one non-limiting use case, the state information may include player health, player inventory, player location, NPC location, NPC health, and the like, while omitting player visual characteristics or NPC colors, and the like.

At block 206, the IL server 110 using, for example, the model generation system 146 generates an imitation learning (IL) model 126 based at least in part on the initial set of user performed actions and the corresponding initial set of states. The IL model 126 may include a deterministic or predictive model. In some cases, the IL model 126 may be a state diagram, such as a Markov model. Each state or node in the model may represent a state, or set of aggregate states, of the video game 112. Each edge between states may represent actions that can lead to one or more other states within the model. In some cases, the generated IL model 126 may comprise a state graph that can be traversed based on a state of the video game 112 and/or prior actions performed by the IL agent 124. Some examples of state graph generation that can be used to create a state graph for testing an instance of the video game 112 are described in U.S. Pat. No. 10,282,280, issued on May 7, 2019 and titled "AUTOMATED SCALABLE VIDEO GAME TESTING SYSTEM," which is hereby incorporated by reference in its entirety herein.

During testing of the concepts disclosed herein, a Markov model was used. However, it should be understood that use of a Markov model is just one example of a model that may be used for the IL model 126. Other models are possible. Further, the IL model 126 may be generated using one or more machine learning algorithms.

In certain embodiments, the IL model 126 is generated separately from a test process that uses the resultant model or predictive function. In some such cases, the data (e.g., identity of user-performed actions and states of the video game 112) may comprise historical data that can be obtained during any period of time prior to generation of the IL model 126. In some such cases, the process 200 may end after performance of the block 206. However, in other cases, an existing IL model 126 may be updated based on additional data. Further, in some cases, generation of the IL model 126 may occur at least partially in parallel with a testing process, such as the process 300. In some such cases, the process 200 may continue to the block 208.

At block 208, the IL server 110 receives an indication of an additional user-performed action and one or more additional corresponding states of the video game 112. The additional user-performed action may be the next action that is performed after the initial set of user-performed actions. Further, as each subsequent user-performed action is performed, the IL server 110 may receive an indication of the subsequent user-performed actions. Receiving the one or more additional corresponding states may include receiving state information associated with the state of the video game 112 before and/or after performance of the additional user-performed action. In some cases, a state of the video game 112 after an action is performed is equivalent to a state of the video game 112 before a subsequent action is performed. Thus, in some such cases, the block 208 may only include receive a state of the video game 112 after an additional user-performed action is performed because the IL server 110 may have already received the state of the video game 112 before the additional user-performed action is performed.

At block 210, the IL server 110 receives a weight associated with the additional user-performed action. The weight may affect how often a path within the IL model 126 is follow or the likelihood that a particular action is determined or predicted during application of the IL model 126 to execution of an instance of the video game 112. In some cases, the weight may be associated with one or more states of the video game 112 and/or the possible actions that may be performed within a particular state of the video game 112.

The weight may be designated by a user. Alternatively, the weight may be determined automatically based, for example, on the frequency that a particular user-performed action is performed or based on the success of the user-performed action in achieving a particular objective with respect to the video game 112 or with respect to testing certain scenarios or elements of the video game 112. Applying a weight to the IL model 126 enables particular actions, events, or states within the video game to be tested more or less frequently as may be desired by the testers or video game developers. As indicated by the dashed lines around the block 210, the block 210 may be optional or omitted. For example, all user-performed actions may be weighted equally.

At block 212, the IL server 110 using, for example, the model generation system 146 updates the IL model 126 based at least in part on the additional user-performed action and the one or more additional corresponding states. In instances where a weight is received as part of the optional block 210, the block 212 may additionally include using the weight received at the block 210 when updating the IL model 126. Updating the IL model 126 may include re-running a machine learning algorithm used to generate the IL model 126. Alternatively, or in addition, updating the IL model 126 may include adding additional states to the IL model 126 associated with newly received user-performed actions (and/or state information of the video game 112). In some cases, updating the IL model 126 may include updating weights associated with particular actions (such as the received user-performed action) or portions of the IL model 126.

The block 212 may include distributing the updated IL model 126 to the test engine 120S or to one or more IL clients 104. In some cases, the entire IL model 126 may be distributed. In other cases, a portion of the IL model 126 that is updated may be distributed. In some cases, the updated IL model 126 is distributed periodically or after a particular number of additional user-performed actions are received and processed to update the IL model 126. In some cases, message passing may be used to pass messages between the model generation system 146 and the test engine 120S or the test engine 120 to provide updates to the IL model 126.

At decision block 214, the IL server 110 determines whether the training process is complete. If it is determined at the decision block 214 that the training process is not complete, the process 200 may return to the block 208 where further user-performed actions and corresponding states of the video game 112 may be received.

If it is determined at the decision block 214 that the training process is complete, the process 200 ends. In some cases, the process 200 may be continued at a later time. For example, it may be determined at a first time that the training process is complete with respect to a particular IL model 126 because, for example, a user 102 stops playing or interacting with an instance of the video game 112. At this first time, the process 200 may pause, be suspended, or end. As some second time that is later than the first time, a user 102 may again begin or continue interacting with the video game 112, or may interact with another instance of the video game 112, such as an instance at an IL client 104. At this second time, the process 200 may restart or continue by, for example, returning to the block 208 where an additional user-performed action (and corresponding state information) performed with respect to the video game 112 may be received.

Example Imitation Learning Based Testing Process

Figure 3:
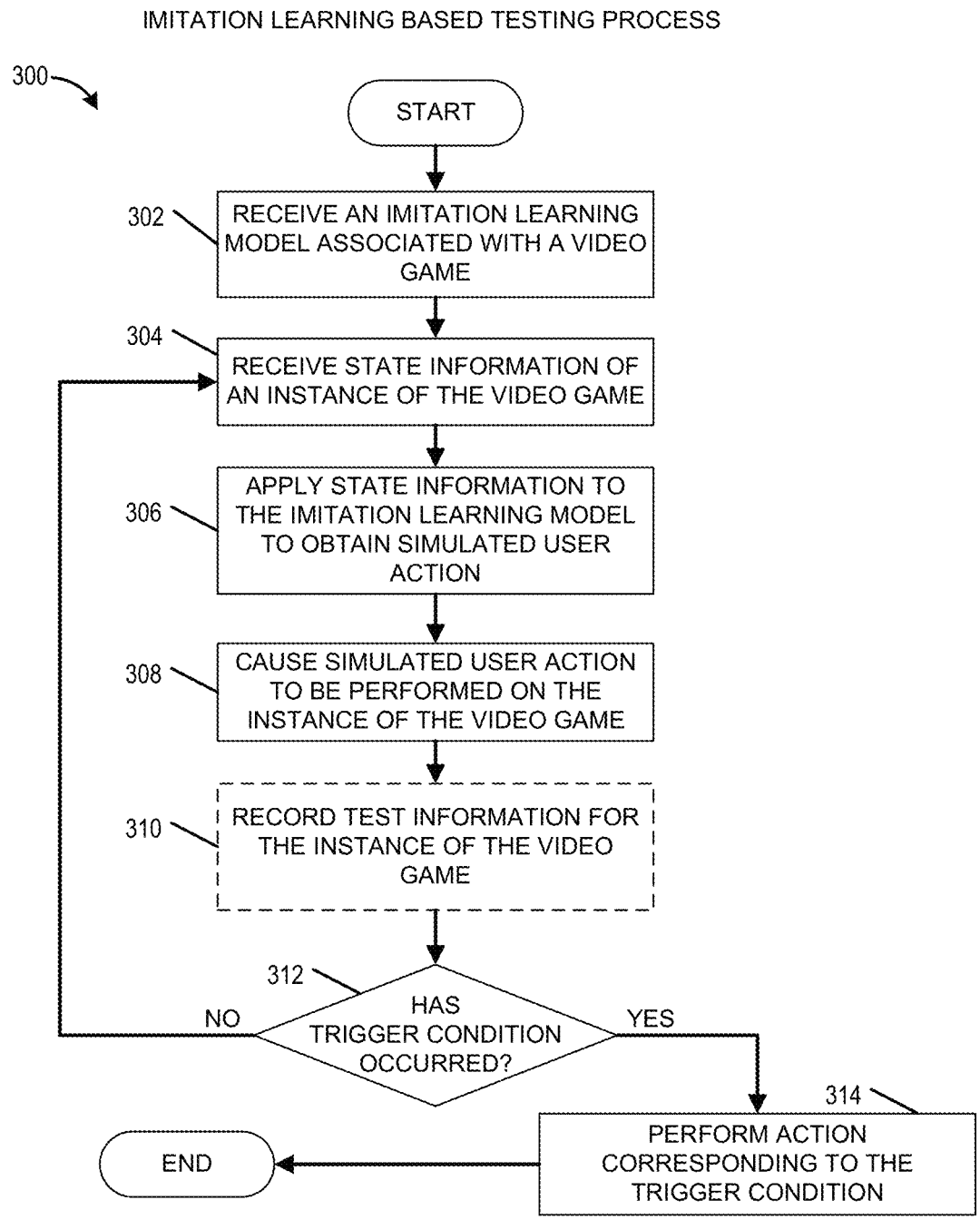
FIG. 3 presents a flowchart of an embodiment of an imitation learning based testing process in accordance with certain aspects of the present disclosure.

FIG. 3 presents a flowchart of an embodiment of an imitation learning based testing process 300 in accordance with certain aspects of the present disclosure. The process 300 can be implemented by any system that can use an IL model 126 to automatically test an instance of a video game 112 with limited or without any user interaction. The process 300, in whole or in part, can be implemented by, for example, an IL client 104, a test engine 120, a test engine 120S, an action predictor 122 (hosted by an IL server 110 or an IL client 104), or an IL agent 124, among others. Although any number of systems, in whole or in part, can implement the process 300, to simplify discussion the process 300 will be described with respect to particular systems.

The process 300 may be performed with respect to one or more instances of the video game 112 hosted by an IL client 104. In some cases, the process 300 may be performed at least partially in parallel to test multiple instances of the video game 112 at least partially in parallel. The number of instances of the video game 112 that may be tested in parallel is only limited by the number of available IL clients and/or computing resources. Thus, in some cases, 10s, 100s, 1000s, or more instances of the video game 112 may be tested at least partially in parallel using embodiments of the process 300.

The process 300 may begin upon an instance of the video game 112 being loaded or executed by an IL client 104. Alternatively, or in addition, the process 300 may begin after execution of the video game 112 reaches a particular point. For example, the process 300 may begin after character selections or configuration, option selections, a playable character reaching a particular point in the game, a particular event occurring, or any other triggering event. In some cases, the triggering event is automatic. In other cases, the triggering event is based on a command by a user. In some cases, a script is used to cause the video game 112 to reach a particular point (for example, the start of game play after option and character selection). In some cases, the completion of the script may serve as a trigger that causes the process 300 to begin.

The process begins at block 302 where the test engine 120S (or the test engine 120) receives an IL model 126 associated with a video game 112. The operations associated with the block 302 may be repeated to provide the IL model 126 to each IL client 104 or performed once to provide the IL model 126 to the IL server 110 or a single IL client 104. In some cases, the IL model 126 may be selected based on a particular test a user desires to be performed. For example, some IL models 126 may be weighted differently to test different aspects of the video game 112.

At block 304, the test engine 120S receives state information of an instance of the video game 112. This instance of the video game 112 may be initiated by a user or initiated automatically as part of an automated testing process. The instance of the video game 112 may be hosted by the IL client 104. Further, the instance of the video game 112 may be controlled, interacted, or played by an IL agent 124. Thus, the user 102 may have little to no interaction with the instance of the video game 112. Advantageously, by having the IL agent 124 control interactions with the instance of the video game 112 without user interaction, more instances of the video game 112 can be tested simultaneously or at least partially in parallel.

At block 306, the test engine 120S using, for example, the action predictor 122 applies the state information to the IL model 126 to obtain a simulated user action, or an indication of an action to be performed with respect to the instance of the video game 112. The action may be an action that a hypothetical user playing an instance of the video game 112 might perform with a user input device (for example, a game controller, a keyboard, a mouse, a gesture controller, or a microphone). In some cases, the action may include an indication to not perform any action, to wait a set period of time before performing an action, or to maintain a current playable character state, which may include continue performing an action being performed (e.g., continue ducking or crouching behind an obstacle).

In some cases, the IL model 126 may be deterministic. Thus, the same simulated user action may be determined each time an instance of the video game 112 reaches or has the same state. In other cases, the IL model 126 may be probabilistic. Thus, the IL model 126, or an action predictor 122 applying the IL model 126, may output the identity of different actions to be performed by an IL agent 124 for two instances of the video game 112 with the same state.

At block 308, the test engine 120S causes the simulated user action to be performed on the instance of the video game 112. The test engine 120S may cause the simulated user action to be performed by transmitting or otherwise providing an indication of the simulated user action or an instruction to perform the simulated user action to the test engine 120 and/or the IL agent 124 at the IL client 104. Upon receipt of the indication of the user action or the command to perform the simulated user action, the test engine 120 and/or the IL agent 124 can perform the simulated user action with respect to the instance of the video game 112 at the IL client 104. In cases where the process 300 is performed by the test engine 120, the test engine 120 may use the IL agent 124 to perform the simulated user action on the instance of the video game 112. Performing the simulated user action may include causing the IL agent 124 to interact with the video game 112 in the same manner that a human user playing the video game 112 might interact. For example, the IL agent 124 may interact with a user interface in place of a human user. Alternatively, the IL agent 124 may provide an input or a signal to an instance of the video game 112 that would be provided by a user interface device if the user 102 were interacting with the user interface device to play the video game 112.

At block 310, the test engine 120S or the test engine 120 may record test information for the instance of the video game 112. The test information can include the action performed (e.g., the identified simulated user action), a state of the instance of the video game 112 before and/or after performance of the action, an output image or display, or any other information a tester may desire to record when testing the video game 112. Operations associated with the block 310 may be optional or omitted as indicated by the dashed lines around the box 310.

At the decision block 312, the test engine 120S or the test engine 120 determines whether a trigger condition has occurred. The trigger condition can include any condition that a tester specifies as triggering an action or change in the testing process. For example, the trigger condition can be an instance of the video game 112 crashing, the identification of a bug, a playable character controlled by the IL agent 124 entering a loop (for example, running in circles, continuing to run into an obstacle, not moving, and the like), an NPC stuck in a loop or not responding to an interaction by the playable character (or other NPCs), the video game 112 entering a state that cannot be identified in the IL model 126, a threshold number of occurrences of a state within the video game 112, or any other condition specified by a tester or developer of the video game 112 that can be identified based on a state of the video game 112 or a state of the IL client 104 executing the video game 112.

If it is determined at the decision block 312 that a trigger condition has not occurred, the process 300 may return to the block 304 where new or updated state information of the instance of the video game 112 may be received. Typically, changes to the state information at each occurrence of the block 304 may be caused or based at least in part on the performance of the simulated user action. However in some cases the state information may change regardless of whether a simulated user action is performed. For example, the state information may change over time due to events occurring in the instance of the video game 112.

If it is determined at the block 312 that a trigger condition has occurred, the process 300 proceeds to the block 314 where the test engine 120S or the test engine 120 performs an action corresponding to the trigger condition. In some cases, the action may be referred to as a "remediation action" as the action may include any type of action that can mitigate, monitor, or otherwise respond to a detected trigger condition. Further, the action may include any type of action that may be performed during testing a video game 112 in response to a result of testing the video game. For example, the action may include alerting a user that the trigger condition occurred, recording one or more actions or events that led up to the trigger event, recording events that occurred for a set period of time before or after the trigger event, or notification or recording action. Further, the action may include adjusting weights in the IL model 126 to modify the frequency that actions occur that led to the trigger event. For example, one or more states, or edges connecting to states, in a Markov model that comprises the IL model 126 may be associated with different weights to cause particular actions to be performed more frequently (or less frequently) to change the frequency that aspects of the video game 112 are tested or to change the frequency that actions occur to provide further testing of an aspect of the video game 112. In some cases, the process 300 may end after performing the action corresponding to the trigger condition. In some other cases, the process 300 may continue by returning to the block 304. For example, the video game 112 crashing may cause the process 300 to end. However, a trigger condition that results in recordation of information relating to the test may not cause the process 300 to end.

In some cases, the action performed responsive to the trigger condition may include pausing execution of the instance of the video game 112 and requesting that or giving the option for the user 102 to take control of the user playable character from the IL agent 124. Advantageously, in certain embodiments, the use of a trigger condition and the ability for a user to resume play of an instance of the video game 112 be executed or controlled by the automated IL agent 124 enables automated testing of the video game 112 with user oversight. For example, in some use cases, when an instance of the video game 112 enters a stuck or loop state where progress in the video game 112 ceases due, for example, the playable character continuously walking into a wall, the test engine 120S or the test engine 120 may determine that a trigger condition has occurred. The test engine 120S or the test engine 120 may cause the instance of the video game to pause, and may alert the user 102 that the test of the video game 112 is not progressing. The user 102 may then decide whether to end the test, to take control of the playable character from the IL agent 124 to progress past the stuck point, or to take some other action.

In a similar use case, the test engine 120S or test engine 120 may determine that an instance of the video game 112 has reached a state that is not associated with a state within the IL model 146 or that an action to be performed by the IL agent 124 cannot be determined. In some such cases, the test engine 120S or the test engine 120 may pause execution of the instance of the video game 112 and request that the user takes control of the playable character from the IL agent 124. Once the user has demonstrated how to proceed by interacting with the playable character, the user 102 may permit the IL agent 124 to resume control of the playable character and the process 300 may continue at the block 304. In either example use case, or in other use cases where the user 102 at least temporarily obtains control of a user playable character from an IL agent 124, the user-performed actions with the instance of the video game on the IL client 104 may be used to update or modify the IL model 126.

After completing one or more operations associated with the block 314, the process 300 may end. Alternatively, the process 300 may return to the block 304. For example, if a user determines that the test should continue regardless of an event that caused the trigger condition, the process 300 may proceed from the block 314 to the block 304 instead of ending.

In some embodiments, the processes 200 and 300 may be performed at least partially in parallel. For example, the IL model 126 may be created using the process 200. Using the process 300, one or more instances of the video game 112 may be tested using the IL model 126 generated with the process 200. As the instance of the video game 112 are being tested, the IL model 126 may be updated based on additional actions performed by the user as part of the ongoing process 300. The process 400 describes certain embodiments of combining IL model 126 generation and video game 112 testing in more detail as part of a test multiplexing process that enables multiple instances of the video game 112 to be tested as a user is interacting with another instance of the video game 112.

Example Automated Test Multiplexing Process

Figure 4:
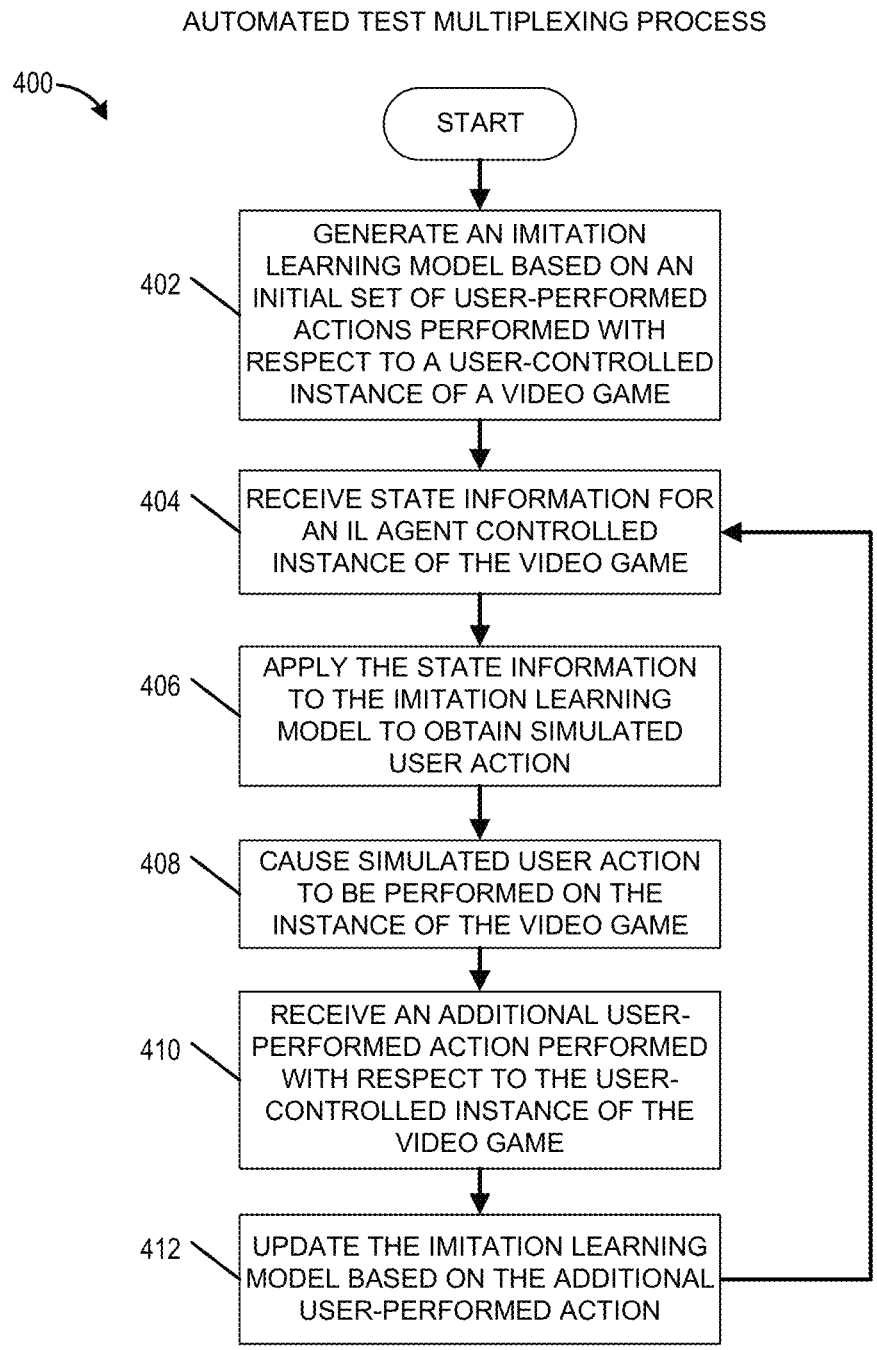
FIG. 4 presents a flowchart of an embodiment of an automated test multiplexing process in accordance with certain aspects of the present disclosure.

FIG. 4 presents a flowchart of an embodiment of an automated test multiplexing process 400 in accordance with certain aspects of the present disclosure. The process 400 can be implemented by any system that can automatically test one or more instances of a video game 112 without user interaction at least partially in parallel with execution of a separate instance of the video game 112 with which a user may interact. The process 400, in whole or in part, can be implemented by, for example, a user computing system 150, a model generation system 146 (hosted by the user computing system 150 or an IL server 110) an IL client 104, a test engine 120, a test engine 120S, an action predictor 122 (hosted by an IL server 110 or an IL client 104), or an IL agent 124, among others. Although any number of systems, in whole or in part, can implement the process 400, to simplify discussion the process 400 will be described with respect to particular systems.

The process 400 may be performed with respect to one or more instances of the video game 112 hosted by an IL client 104. The number of instances of the video game 112 that may be tested in parallel is only limited by the number of available IL clients and/or computing resources. Thus, in some cases, 10s, 100s, 1000s, or more instances of the video game 112 may be tested at least partially in parallel using embodiments of the process 400. In some cases, the process 400 may be performed at least partially in parallel to test multiple instances of the video game 112 at least partially in parallel. In some cases, a time difference between execution of the instance of the video game 112 at the user computing system 150 and execution of instances of the video game 112 at the IL clients 104 is approximately the amount of time to obtain user interaction and/or state information for the instance of the video game 112 at the user computing system 150, to generate or update the IL model 126 based on the obtained information, to determine an action to be performed by the IL agent 124 based on the IL model 126, and to provide the identity of the action to the IL agent 124. As the amount of time to perform the foregoing actions may be on the order of seconds or less, the time difference between execution of the instance of the video game 112 at the user computing system 150 and execution of the instance of the video game 112 at an IL client 104 may, in some cases, by seconds or less. However, in other cases, the time difference may be greater (for example, minutes).

The process 400 may begin upon an instance of the video game 112 being loaded or executed by an IL client 104 and/or a user computing system 150. Alternatively, or in addition, the process 400 may begin after execution of the video game 112 reaches a particular point. For example, the process 400 may begin after character selections or configuration, option selections, a playable character reaching a particular point in the game, a particular event occurring, or any other triggering event. In some cases, the triggering event is automatic. In other cases, the triggering event is based on a command by a user. In some cases, a script is used to cause the instance of the video game 112 at the user computing system 150 and/or the IL clients 104 to reach a particular point (for example, the start of game play after option and character selection). In some cases, the completion of the script may serve as a trigger that causes the process 400 to begin.

The process begins at block 402 where the model generation system 146 of the user computing system 150 or of the IL server 110 generates an IL model 126 based at least in part on an initial set of user-performed actions performed with respect to a user-controlled instance of a video game 112. In certain embodiments, the block 402 may include performing one or more of the operations previously described with respect to the process 200. For example, the block 402 may include performing operations associated with the blocks 202, 204, and 206.

In some implementations, the block 402 may include providing the generated IL model 126 to the IL server 110. For example, in cases where the IL model 126 is generated by an instance of the model generation system 146 at the user computing system 150, the IL model 126 may be provided to the IL server 110 during or after its generation. Alternatively, or in addition, the block 402 may include providing the generated IL model 126 to one or more of the IL clients 104 during or after generation of the IL model 126.

At block 404, the action predictor 122 of the test engine 120S, or of the test engine 120, receives state information for an IL agent 124 controlled instance of the video game 112 at an IL client 104. Operations of the block 404 may be repeated for each instance of the video game 112 being executed on each of one or more IL clients 104. In some embodiments, the block 404 may include one or more of the embodiments described with respect to the block 304.

At block 406, the action predictor 122 of the test engine 120S, or of the test engine 120, applies the state information received at the block 404 to the IL model 126 to obtain a simulated user action, or an indication of an action to be performed with respect to the instance of the video game 112 at the IL client 104 that provided the state information. Operations of the block 406 may be repeated for each instance of the video game 112 being executed on each of one or more IL clients 104. In some embodiments, the block 406 may include one or more of the embodiments described with respect to the block 306.

At block 408, the test engine 120S, or the test engine 120, causes the simulated user action to be performed on the instance of the video game 112 corresponding to the instance of the video game for which the state information was received at the block 404. Operations of the block 408 may be repeated for each instance of the video game 112 being executed on each of one or more IL clients 104. In some embodiments, the block 408 may include one or more of the embodiments described with respect to the block 308.

At block 410, the model generation system 146 of the user computing system 150 or of the IL server 110 receives an additional user-performed action performed with respect to the user-controlled instance of the video game 112. In some cases, the block 410 may include receiving one or more states associated with the user-controlled instance of the video game 112. For example, the block 410 may include receiving a state of the user-controlled instance of the video game before the additional user-performed action is performed and a state of the user-controlled instance of the video game after the additional user-performed action is performed. In some embodiments, the block 410 may include one or more of the embodiments previously described with respect to the block 208.

At block 412, the model generation system 146 of the user computing system 150 or of the IL server 110 updates the IL model 126 based at least in part on the additional user-performed action. Further, the model generation system 146 may update the IL model 126 based at least in part on state information received for the video game 112 as part of the block 410. In some cases, the block 412 includes providing the updated IL model 126 to the IL server 110 and/or to the IL clients 104. As previously described, providing the updated IL model 126 may include providing updates to an existing instance of the IL model 126 at the IL server 110 or IL clients 104. Alternatively, or in addition, providing the updated IL model 126 may include providing a replacement for the IL model 126 at the IL server 110 or IL clients 104. In some embodiments, the block 412 may include one or more of the embodiments previously described with respect to the block 212. In some cases, the block 412 may include pausing execution of the instance of the video game 112 at the IL client 104 while the IL model 126 is updated.

The process 400 may return to the block 404 wherein additional state information for the IL agent 124 controlled instances of the video game 112 may be received. The process 400 may then continue as previously described, but with the updated IL model 126 being used to determine or predict subsequent actions to perform with respect to the IL agents 124 controlled instances of the video game 112.

As previously stated, the process 400 may be performed with respect to any number of instances of the video game 112 at any number of instances of the IL clients 104. Accordingly, in some embodiments, operations of the process 400 may be repeated for each instance of the video game 112 under test. For example, the operations associated with the blocks 404-408 may be performed for each instance of the video game 112 under test, or for each IL agent 124 controlled instance of the video game 112. The performance of the blocks 404-408 for each instance of the video game 112 controlled by an IL agent 124 may be performed at least partially in parallel. Thus, in some cases, multiple instances of the video game 112 may be testing the same feature, executing at the same point within the video game 112, or have the same or similar state.

In some cases, due for example to the identification of different actions to be performed with respect to different instances of the video game 112, at least some of the instances of the video game 112 under test may differ in state, the feature being tested, or execution. Further, although the IL agents 124 may control different instances of the video game 112, in some cases, the difference instances may be different client instances that interaction with the same server-based video game 112S. In other words, each IL agent 124 may control a different playable character that explores or plays in the same instance of a persistent world maintained by the video game 112S at the application host system 106.

In some cases, the process 400 may be performed sequentially as illustrated. In other cases, operations of the process 400 may be performed at least partially in parallel. For example, the operations of the block 404 and the block 410 may occur simultaneously, or at least partially in parallel. In some cases, the operations associated with the block 402 may occur at a first time, and the operations associated with the blocks 404-408 may occur at a second time that is later than the first time. The operations associated with the blocks 410 and 412 may also occur at the second time, or may occur at a third time that is later than the second time. In some cases, multiple instances of the operations of the blocks 404-408 may occur at least partially in parallel. For example, if ten instances of the video game 112 are being tested by ten different IL agents 124 hosted by ten different IL clients 104, the blocks 404-408 may occur ten times simultaneously, or at least partially in parallel. In some cases, at least some of the instances of the video game 112 may execute differently or have different states during the same point of execution due, for example, to randomizers within the video game 112 generating different results (e.g., different numbers or locations of enemies). Further, at least some of the instances of the video game 112 may have different states because, for example, the action predictors 122 for each instance may select different actions to perform using the IL models 126.

In some cases, at least some instances of the video game 112 may be different versions of the video game 112. For example, a tester or developer may use embodiments disclosed herein to test different configurations or versions of the video game 112 at least partially in parallel to determine which version is preferable based on one or more criteria as determined by the tester (e.g., which version runs faster, or provides a greater challenge, or fixes an identified bug or error in the code). Advantageously, the ability to perform operations of the process 400 multiple times in synch or at least partially in synch enables multiple versions of the video game 112 to be tested at substantially the same time.

Proof of Concept Implementation

In one proof of concept of embodiments of the process 400, a Markov model was used to generate an IL model. During testing of the proof of concept, a user controlled the navigation of a playable character, having a spork as an avatar, that can travel freely within a two dimensional space. The proof of concept included several tunable or configurable IL agent controlled forks, and other avatars, configured to mimic the user-controlled spork. Some performances of the proof of concept included dozens of IL agent controlled characters. Within approximately two seconds, each of the IL agent controlled forks, using the Markov model, began mimicking the user-controlled fork. The amount of time it takes for the IL agent controlled forks to being mimicking the user-controlled fork is configurable. Although the forks generally mimicked the user-controlled fork, differences in state enabled some variance between the forks enabling testing of different states simultaneously with only a single user interacting with the proof of concept fork video game.

FIGS. 9A-9D illustrate several frames from one performance of the above-described proof of concept. The frames illustrate a user-controlled spork and several IL agent controlled kitchen implements (e.g., forks, knives, rolling pins, etc.), which may be referred to an IL agent controlled characters. Although all of the IL agent controlled avatars are depicted within the same instance of the proof of concept environment, as previously described, the IL agent controlled characters can be in separate instances of a video game.

Figure 9A:
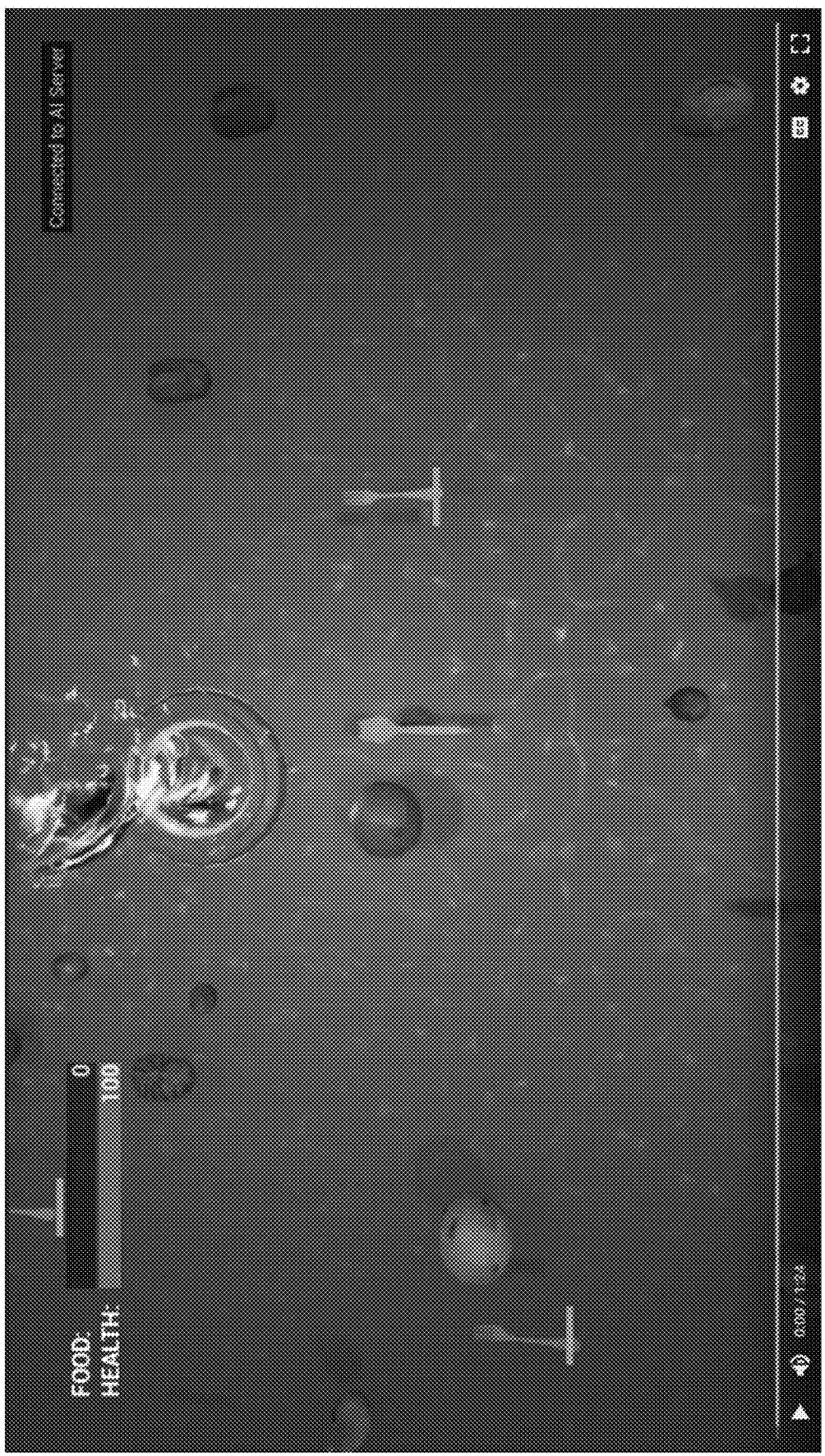
FIGS. 9A-9D illustrate several frames from one performance of a proof of concept implementation of the imitation learning system described herein.

FIG. 9A illustrates an initial state of a video game created for the proof of concept (PoC). The user-controlled spork is in the center of the frame. Several IL agent controlled characters (e.g., forks) can be seen within the frame. Additional IL agent controlled characters are simultaneously executing within the PoC that are not viewable in FIG. 9A (some of the additional characters are viewable in FIGS. 9B-9D). Although each of the IL agent controlled characters are spawned (or start) in different locations of the PoC world, they all face in the same direction (North or with the tines pointing in the same direction) in the PoC. At the point in the PoC illustrated in FIG. 9A, no user input has been received and neither the user-controlled spork nor the IL agent controlled characters are moving.

Figure 9B:
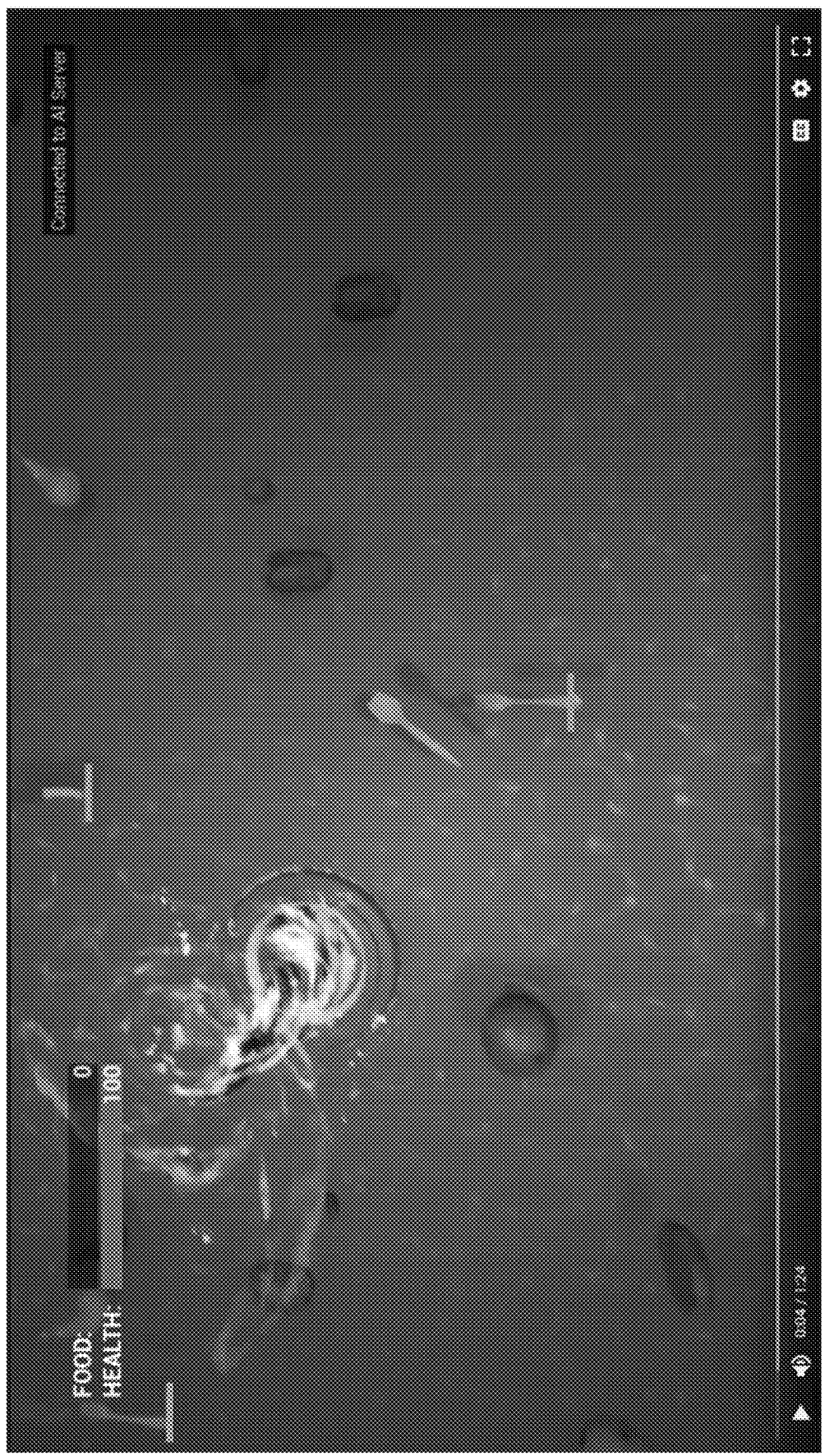

FIG. 9B illustrates a frame of the PoC approximately four seconds into the execution of the PoC video game. At this point during the PoC, the user has moved the spork up and to the right. The imitation learning server 110 is generating the Markov model based on the state of the video game and the user's actions with respect to the spork. The IL agent controlled characters are not yet moving or performing any action as the Markov model is being generated and updated using the first four seconds of the data obtained during the PoC.

Figure 9C:
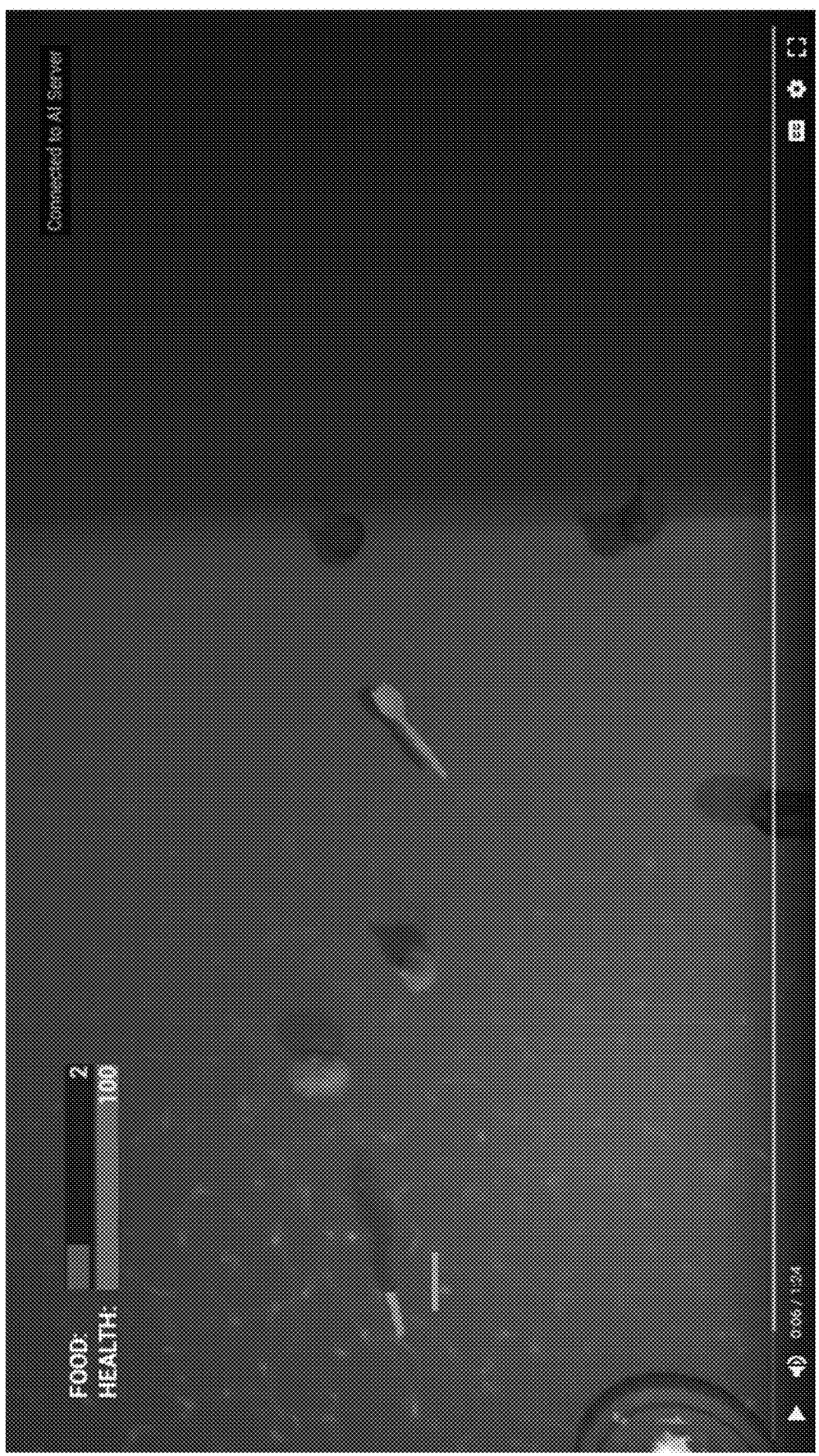

FIG. 9C illustrates a frame of the PoC approximately six seconds into the execution of the PoC video game. At this point during the PoC, the IL agent controlled characters have begun moving based on the Markov model that has been generated and is being updated as the user-controlled spork continues to move. As illustrated, by the knife moving towards a potato in the frame of FIG. 9C, the IL agent controlled characters begin to move similarly to the spork. However, as the state differs for each IL agent controlled character, the movement is not identical. The difference in movement can be seen by the differing angle between the knife and spork as the IL agent controlled knife attempts to mimic the movement of the user-controlled spork. This difference in movement enables additional states to be tested within the video game without have multiple users controlling the different characters in the video game.

Figure 9D:
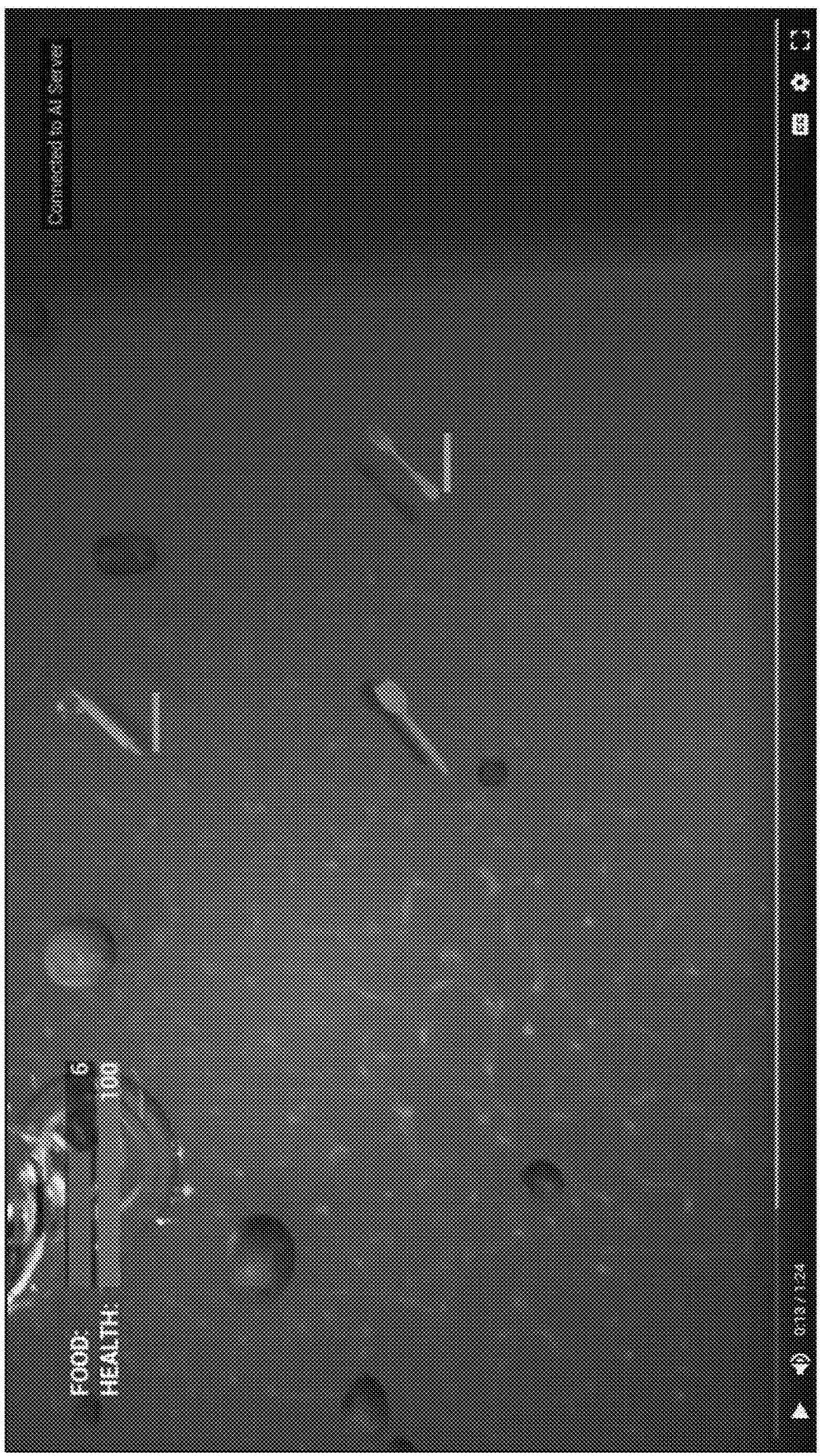

FIG. 9D illustrates a frame of the PoC approximately 13 seconds into the execution of the PoC video game. At this point during the PoC, the Markov model has been generated based on an increased amount of data. The IL agent controlled characters moving based on the Markov model are more closely mimicking the action of the spork as indicated by the more similar angles and the increased closeness to the spork compared to FIG. 9C. Although not illustrated in the frames presented, as the PoC continues, the user-controlled spork begins to change actions. Consequently, the Markov model is updated and the IL agent controlled characters modify their actions based on the updated Markov model. At first, the IL agent controlled characters movements vary widely from the user-controlled spork. However, as additional state information is obtained, the IL agent controlled characters again begin to move similarly, but not identically, to the user-controlled spork. Advantageously, the similar, but non-identical movements of the IL agent controlled characters enables a wider variety of testing compared to systems that use fixed scripts that do not permit for test variation without a user manually spending the time to modify the scripts.

Example Model Generation System

Figure 5:
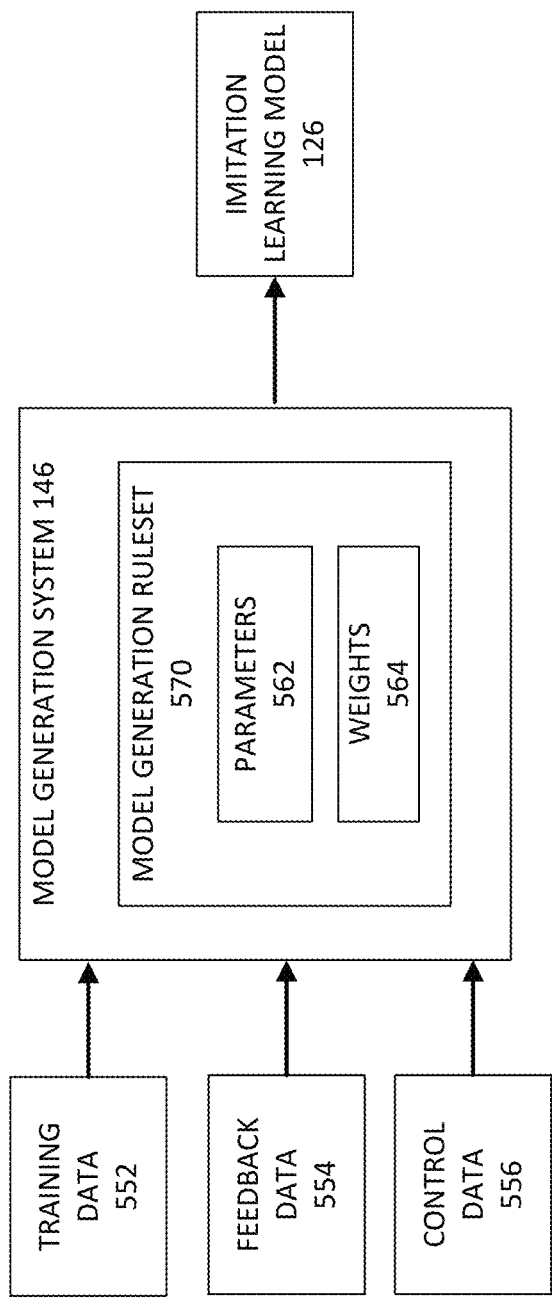
FIG. 5 illustrates an embodiment of a model generation system of FIG. 1.

FIG. 5 illustrates an embodiment of a model generation system of FIG. 1. The model generation system 146 may be used to determine one or more IL models 126 based on user-performed actions with respect to a video game 112. In some cases, the user-performed actions may be with respect to a single user's interaction with an instance of the video game 112 or multiple user's interaction with the video game 112. As previously described, at least some of the user-interaction data may be obtained as one or more IL agents 124 are using an initial generated IL model 126 to test an instance of the video game 112. In some other cases, the user-interaction data may be historical data that is obtained at some prior time (for example, during prior executions of the video game 112, within the last day, within the last week, etc.). In either case, the data may be referred to as training data 552. The training data 552 may include data associated with multiple users. Further, the training data 552 can include data received from one or more data sources, such as, for example, an application host system 106, a user computing system 150, and/or one or more IL clients 104.

Generally, at least at first, the training data 552 may not include a lot of data points because, as previously described, training of the IL model 126 may be occurring at least partially in parallel with the testing of the video game 112 (e.g., process 400). However, in some embodiments, the training data 552 may include a very large number of data points, such as millions of data points, which may be aggregated into one or more data sets. In some cases, the training data 552 may be accessed from a data repository (not shown).

The model generation system 146 may, in some cases, also receive feedback data 554. This data may be received as part of a supervised model generation process that enables a user, such as the user 102 interacting with the video game 112 to generate the IL model 126, to provide additional input to the model generation system 146 that may be used to facilitate generation of the IL model 126. For example, if an anomaly exists in the training data 552 (e.g., selection of a pause button while the user 102 takes a break), the user may tag the anomalous data enabling the model generation system 146 to handle the tagged data differently, such as by applying a different weight to the data or excluding the data from the model generation process.

Further, the model generation system 146 may receive control data 556. This control data 556 may identify one or more features or characteristics for which the model generation system 146 is to determine a model. Further, in some cases, the control data 556 may indicate a value for the one or more features identified in the control data 556. For example, the control data 556 may identify actions to perform when the video game 112 enters a particular state. In some cases, this control data 556 may identify trigger conditions that cause the resultant IL model 126 to perform a trigger action (e.g., alert a user) when a particular trigger occurs.

The model generation system 146 may generally include a model generation rule set 570 for generation of the IL model 126. The rule set 570 may include one or more parameters 562. Each set of parameters 562 may be combined using one or more mathematical functions to obtain the IL model 126. These parameters 562 may be combined based on rules included in the model generation ruleset 570. Further, one or more specific parameters may be weighted by the weights 564. In some cases, the IL model 126 may be obtained by combining a set of parameters with a respective set of weights 564. The IL model 126 and/or the respective parameters 562 of the IL model 126 may be derived during a training process based on particular input data, such as the training data 552, feedback data 554, and control data 556, and defined output criteria, which may be included with the training data 552, used for training purposes. The model generation rule set 570 can define the specific machine learning rules and/or algorithms the model generation system 146 uses to generate the model based on a defined objective function, such as determining an in-game action for an IL agent 124 to perform with respect to an instance of the video game 112. In some embodiments, initial parameters 562 and weights 564 can be manually provided during the initiation of the model generation process. The parameters 562 and weights 564 can be updated and modified during the model generation phase to generate the IL model 126.

After the IL model 126 has been generated, the model can be used during runtime of the action predictor 122 to determine or predict an action for the IL agent 124 to perform with respect to a playable character controlled by the IL agent 124 during execution of the instance of the video game 112 at the IL client 104. In some cases, the generated IL model 126 is deterministic. For example, the IL model 126 may comprise a state graph that can be traversed based on a state of the video game 112 and prior actions performed by the IL agent 124. The IL agent 124 may perform the predicted action on the video game 112 at the IL client 104 on behalf of a tester to automatically test the video game 112 without user input.

Example Action Predictor

Figure 6:
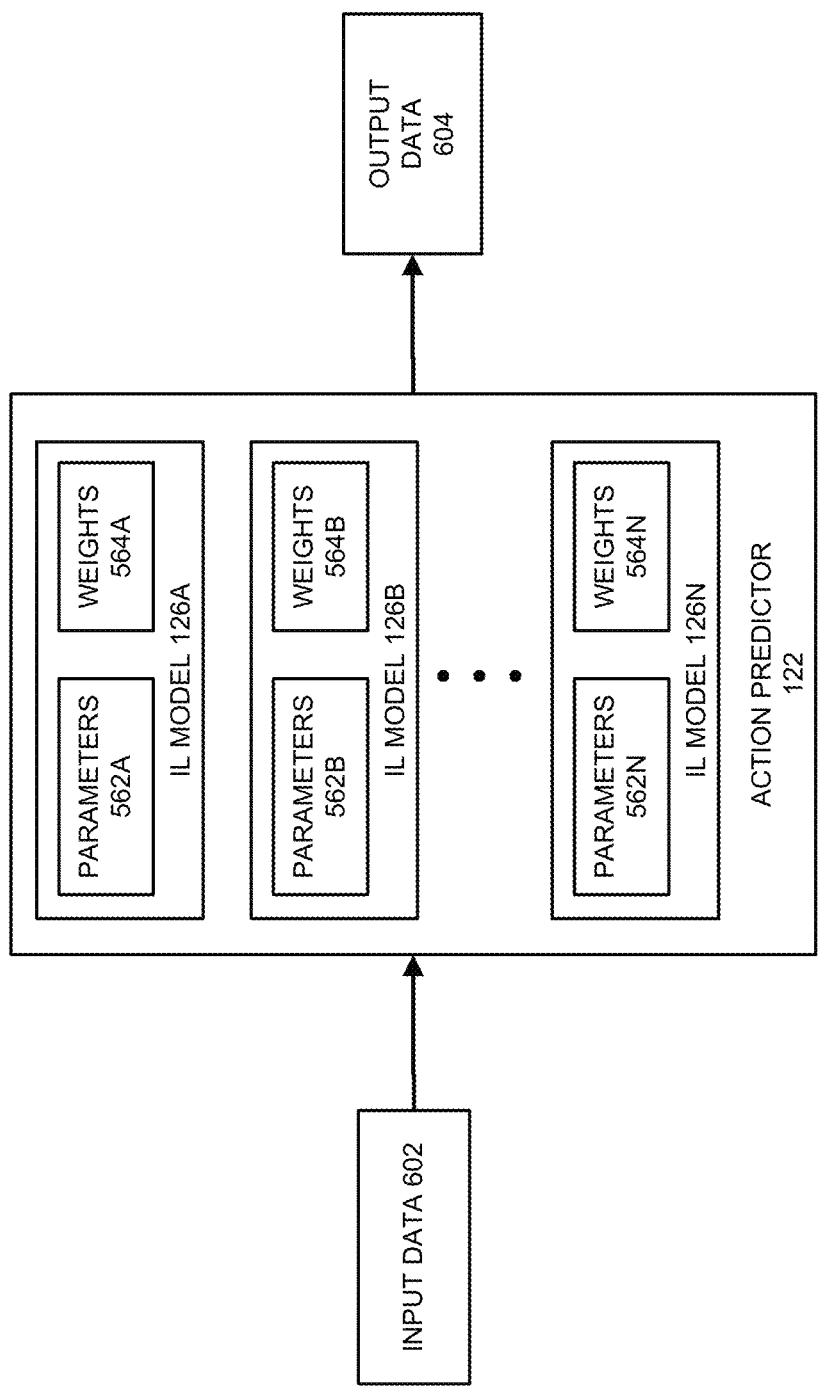
FIG. 6 illustrates an embodiment of an action predictor 122 of FIG. 1.

FIG. 6 illustrates an embodiment of an action predictor 122 of FIG. 1. The action predictor 122 can apply or use one or more of the IL models 126 generated by the model generation system 146. The action predictor 122 may use one or more IL models 126A, 126B, 126N (which may be referred to collectively as "IL models 126" or in the singular as "IL model 126") to process the input data 602 to obtain the output data 604. Although multiple IL models 126 may be available to the action predictor 122, in certain use cases, the action predictor 122 uses a single IL model 126, which may be updated during testing, when testing an instance of the video game 112.

The action predictor 122 may apply the IL models 126 during testing an instance of the video game 112 to determine or predict an action for the IL agent 124 to perform on the instance of the video game 112. During testing of the instance of the video game 112, the action predictor 122 receives input data 602 that can be applied an IL model 126. As previously described, the input data 602 can include one or more pieces of state information associated with the instance of the video game 112 under test. In some cases, the state information is filtered or is selected to include only data to be applied to the IL model 126. In other cases, the state information may include all information associated with the state of the video game 112. In the latter case, the input data 602 may be filtered to select specific state information that can be applied to the IL model 126 to predict or determine an action for the IL agent 124 to perform on the instance of the video game 112.

The output data 604 can be an action or an identification of an action that an IL agent 124 is to perform on the instance of the video game 112 under test at the IL client 104. In some cases, the IL model 126 is predictive of what action a user playing the instance of the video game 112 might perform. The action predictor 122 may generate an output based on the predicted percentage of times a particular action is performed with respect to the instance of the video game 112 in a particular state. Thus, if it is predicted that a particular action is performed 70% of the time, 70% of the time the action predictor 122 may identify the action in the output data 604, and 30% of the time, another action may be identified.

It should be understood that the prediction of what action a user 102 may perform when the video game 112 may be based on the feature of the video game 112 that the tester desires to test. The feature to be tested may include events related to unsuccessful play of the video game 112. In some such cases, the user 102 may generate the IL model 126 by performing actions relating to the test including actions that are unsuccessful for completing an objective in the video game 112 or actions that may not be the optimal way to complete an objective. Consequently, the output data 604 may include the identification of actions to be performed by the IL agent 124 that leads to unsuccessful completion of the video game 112 or less than optimal actions for the particular state of the video game 112.

The IL models 126 may include a set of one or more parameters 562A, 562B, 562N, respectively (which may be referred to collectively as "parameters 562"). Each set of parameters 562 (such as parameters 562A) may be combined using one or more mathematical functions to obtain a parameter function or an IL model 126. Further, one or more specific parameters from the parameters 562A, 562B, 562N may be weighted by the weights 564A, 564B, 564N (which may be referred to collectively as "weights 564"). In some cases, the IL model 126 may be obtained by combining a set of parameters (such as the parameters 562A) with a respective set of weights 564 (such as the weights 564A).

Overview of Computing System

Figure 7:
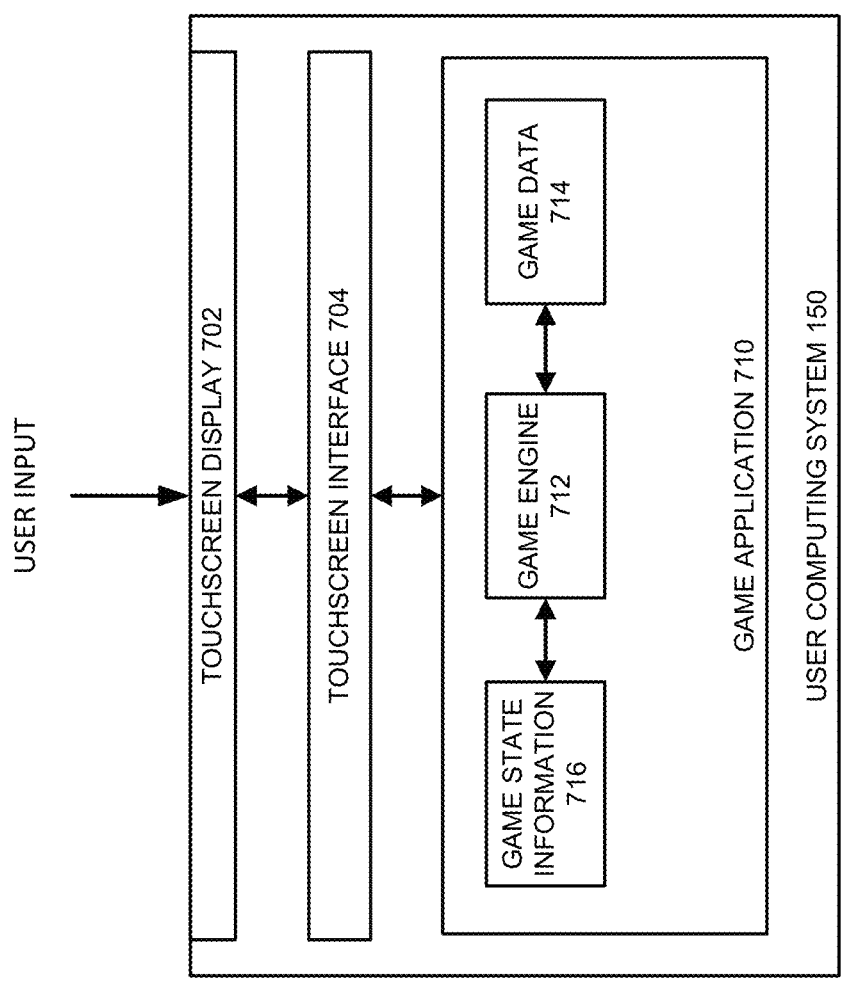
FIG. 7 illustrates an embodiment of a user computing system.

FIG. 7 illustrates an embodiment of a user computing system 150, which may also be referred to as a gaming system. Further, as previously described, the IL clients 104 may include one or more of the embodiments described with respect to the user computing system 150. As illustrated, the user computing system 150 may be a single computing device that can include a number of elements. However, in some cases, the user computing system 150 may include multiple devices. For example, the user computing system 150 may include one device that includes that includes a central processing unit and a graphics processing unit, another device that includes a display, and another device that includes an input mechanism, such as a keyboard or mouse.

The user computing system 150 can be an embodiment of a computing system that can execute a game system. In the non-limiting example of FIG. 7, the user computing system 150 is a touch-capable computing device capable of receiving input from a user via a touchscreen display 702. However, the user computing system 150 is not limited as such and may include non-touch capable embodiments, which do not include a touchscreen display 702.

The user computing system 150 includes a touchscreen display 702 and a touchscreen interface 704, and is configured to execute a game application 710. This game application may be the video game 112 or an application that executes in conjunction with or in support of the video game 112, such as a video game execution environment. Although described as a game application 710, in some embodiments the application 710 may be another type of application that may have a variable execution state based at least in part on the preferences or capabilities of a user, such as educational software. While user computing system 150 includes the touchscreen display 702, it is recognized that a variety of input devices may be used in addition to or in place of the touchscreen display 702.

The user computing system 150 can include one or more processors, such as central processing units (CPUs), graphics processing units (GPUs), and accelerated processing units (APUs). Further, the user computing system 150 may include one or more data storage elements. In some embodiments, the user computing system 150 can be a specialized computing device created for the purpose of executing game applications 710. For example, the user computing system 150 may be a video game console. The game applications 710 executed by the user computing system 150 may be created using a particular application programming interface (API) or compiled into a particular instruction set that may be specific to the user computing system 150. In some embodiments, the user computing system 150 may be a general purpose computing device capable of executing game applications 710 and non-game applications. For example, the user computing system 150 may be a laptop with an integrated touchscreen display or desktop computer with an external touchscreen display. Components of an example embodiment of a user computing system 150 are described in more detail with respect to FIG. 8.

The touchscreen display 702 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 702. The touchscreen interface 704 can be configured to translate the touch input into data and output the data such that it can be interpreted by components of the user computing system 150, such as an operating system and the game application 710. The touchscreen interface 704 can translate characteristics of the tactile touch input touch into touch input data. Some example characteristics of a touch input can include, shape, size, pressure, location, direction, momentum, duration, and/or other characteristics. The touchscreen interface 704 can be configured to determine the type of touch input, such as, for example a tap (for example, touch and release at a single location) or a swipe (for example, movement through a plurality of locations on touchscreen in a single touch input). The touchscreen interface 704 can be configured to detect and output touch input data associated with multiple touch inputs occurring simultaneously or substantially in parallel. In some cases, the simultaneous touch inputs may include instances where a user maintains a first touch on the touchscreen display 702 while subsequently performing a second touch on the touchscreen display 702. The touchscreen interface 704 can be configured to detect movement of the touch inputs. The touch input data can be transmitted to components of the user computing system 150 for processing. For example, the touch input data can be transmitted directly to the game application 710 for processing.

In some embodiments, the touch input data can undergo processing and/or filtering by the touchscreen interface 704, an operating system, or other components prior to being output to the game application 710. As one example, raw touch input data can be captured from a touch input. The raw data can be filtered to remove background noise, pressure values associated with the input can be measured, and location coordinates associated with the touch input can be calculated. The type of touch input data provided to the game application 710 can be dependent upon the specific implementation of the touchscreen interface 704 and the particular API associated with the touchscreen interface 704. In some embodiments, the touch input data can include location coordinates of the touch input. The touch signal data can be output at a defined frequency. Processing the touch inputs can be computed many times per second and the touch input data can be output to the game application for further processing.

A game application 710 can be configured to be executed on the user computing system 150. The game application 710 may also be referred to as a video game, a game, game code and/or a game program. A game application should be understood to include software code that a user computing system 150 can use to provide a game for a user to play. A game application 710 might comprise software code that informs a user computing system 150 of processor instructions to execute, but might also include data used in the playing of the game, such as data relating to constants, images and other data structures. For example, in the illustrated embodiment, the game application includes a game engine 712, game data 714, and game state information 716.

The touchscreen interface 704 or another component of the user computing system 150, such as the operating system, can provide user input, such as touch inputs, to the game application 710. In some embodiments, the user computing system 150 may include alternative or additional user input devices, such as a mouse, a keyboard, a camera, a game controller, and the like. A user can interact with the game application 710 via the touchscreen interface 704 and/or one or more of the alternative or additional user input devices. The game engine 712 can be configured to execute aspects of the operation of the game application 710 within the user computing system 150. Execution of aspects of gameplay within a game application can be based, at least in part, on the user input received, the game data 714, and game state information 716. The game data 714 can include game rules, prerecorded motion capture poses/paths, environmental settings, constraints, animation reference curves, skeleton models, and/or other game application information. Further, the game data 714 may include information that is used to set or adjust the difficulty of the game application 710.

The game engine 712 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 710, the game application 710 can store game state information 716, which can include character states, environment states, scene object storage, and/or other information associated with a state of execution of the game application 710. For example, the game state information 716 can identify the state of the game application at a specific point in time, such as a character position, character action, game level attributes, and other information contributing to a state of the game application.

The game engine 712 can receive the user inputs and determine in-game events, such as actions, collisions, runs, throws, attacks and other events appropriate for the game application 710. During operation, the game engine 712 can read in game data 714 and game state information 716 in order to determine the appropriate in-game events. In one example, after the game engine 712 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

Figure 8:
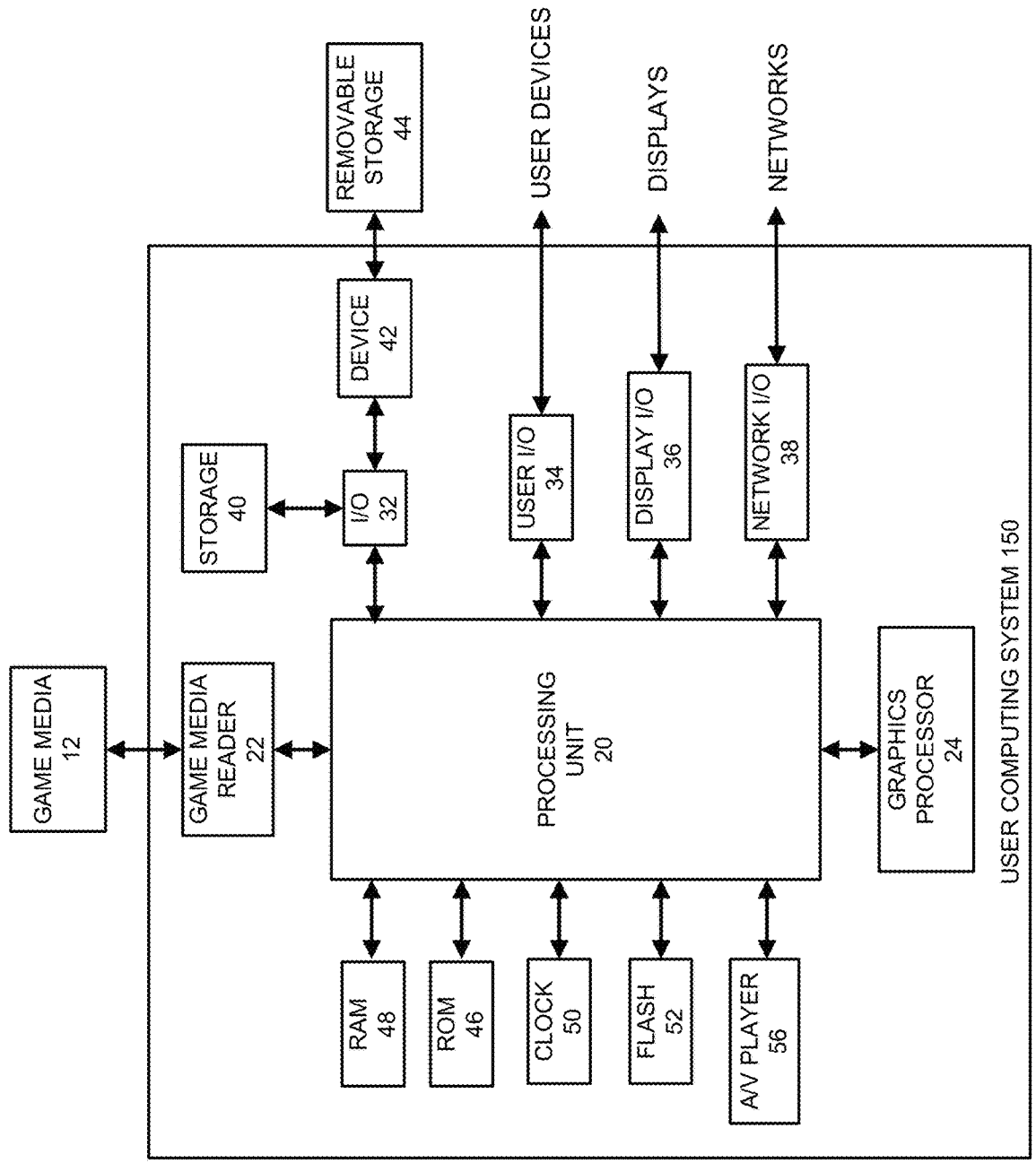
FIG. 8 illustrates an embodiment of a hardware configuration for the user computing system of FIG. 7.

FIG. 8 illustrates an embodiment of a hardware configuration for the user computing system 150 of FIG. 7. Further, as previously described, the IL clients 104 may include one or more of the embodiments described with respect to the user computing system 150. Other variations of the user computing system 150 may be substituted for the examples explicitly presented herein, such as removing or adding components to the user computing system 150. The user computing system 150 may include a dedicated game device, a smart phone, a tablet, a personal computer, a desktop, a laptop, a smart television, a car console display, and the like. Further, (although not explicitly illustrated in FIG. 8) as described with respect to FIG. 7, the user computing system 150 may optionally include a touchscreen display 702 and a touchscreen interface 704.

As shown, the user computing system 150 includes a processing unit 20 that interacts with other components of the user computing system 150 and also components external to the user computing system 150. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 150 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 150 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 150 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for user computing system 150. Processing unit 20 can communicate through I/O 32 to store data, such as game state data and any shared data files. In addition to storage 40 and removable storage media 44, user computing system 150 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the user computing system 150 on a display device, such as graphics, user interfaces, video, and/or other visual content. The user computing system 150 may comprise one or more integrated displays configured to receive display output signals produced by the display I/O 36, which may be output for display to a user. According to some embodiments, display output signals produced by the display I/O 36 may also be output to one or more display devices external to the user computing system 150.

The user computing system 150 can also include other features that may be used with a game, such as a clock 50, flash memory 52, and other components. An audio/video player 56 might also be used to play a video sequence, such as a movie. It should be understood that other components may be provided in the user computing system 150 and that a person skilled in the art will appreciate other variations of the user computing system 150.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 150 is turned off or loses power.

As user computing system 150 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

ADDITIONAL EMBODIMENTS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
   as implemented by an interactive computing system configured with specific computer-executable instructions,
   accessing an imitation learning model of a video game under test hosted by a user computing system, the imitation learning model generated at a first time based on a set of user interactions with a user-controlled instance of the video game; and
   for each of a set of agent-controlled instances of the video game, wherein the set of agent-controlled instances of the video game are hosted by a set of computing systems separate from the user computing system:
   receiving first state information at a second time for the agent-controlled instance of the video game, wherein the second time is later than the first time, and wherein the first state information is indicative of an execution state of the agent-controlled instance of the video game;
   applying the first state information to the imitation learning model to obtain a first simulated user action; and
   causing an imitation learning (IL) agent to perform the first simulated user action with respect to the agent-controlled instance of the video game,
   wherein the first state information for at least one of the set of agent-controlled instances of the video game differs from the first state information for at least one other of the set of agent-controlled instances of the video game.

2. The computer-implemented method of claim 1, further comprising:
   receiving an indication of a user action performed with respect to the user-controlled instance of the video game; and
   modifying the imitation learning model of the video game based at least in part on the indication of the user action to obtain an updated imitation learning model.

3. The computer-implemented method of claim 2, wherein the user action is performed subsequent to the set of user interactions used to generate the imitation learning model.

4. The computer-implemented method of claim 2, further comprising, for each of the set of agent-controlled instances of the video game:
   receiving second state information at a third time for the agent-controlled instance of the video game, wherein the third time is later than the second time;
   applying the second state information to the updated imitation learning model to obtain a second simulated user action; and
   causing the imitation learning agent to perform the second simulated user action with respect to the agent-controlled instance of the video game.

5. The computer-implemented method of claim 2, further comprising receiving state information for the user-controlled instance of the video game, wherein the imitation learning model of the video game is modified based at least in part on the indication of the user action and the state information.

6. The computer-implemented method of claim 5, wherein the state information comprises pre-state information corresponding to the state of the user-controlled instance of the video game prior to performance of the user action, post-state information corresponding to the state of the user-controlled instance of the video game after performance of the user action, or both pre-state information and post-state information.

7. The computer-implemented method of claim 2, further comprising receiving a weighting associated with the user action, wherein the modifying of the imitation learning model to obtain the updated imitation learning model is based at least in part on the indication of the user action and the weighting associated with the user action.

8. The computer-implemented method of claim 1, wherein the set of agent-controlled instances of the video game comprises one or more instances of the video game.

9. The computer-implemented method of claim 1, further comprising, upon detecting a trigger condition at an agent-controlled instance of the video game of the set of agent-controlled instances of the video game, performing a remediation action.

10. The computer-implemented method of claim 9, wherein the remediation action comprises providing control of the agent-controlled instance of the video game to a user.

11. The computer-implemented method of claim 9, wherein the remediation action comprises modifying a weighting of a state within the imitation learning model.

12. The computer-implemented method of claim 9, wherein the trigger condition comprises: a threshold number of occurrences of a video game state, an error, or an occurrence of an unexpected state, wherein the unexpected state comprises a state not included in the imitation learning model.

13. A system comprising:
   an electronic data store configured to store an imitation learning model generated based on a set of user interactions with a user-controlled instance of a video game hosted by a user computing system; and a hardware processor of a test system in communication with the electronic data store, the hardware processor configured to execute specific computer-executable instructions to at least:

access the imitation learning model of the video game from the electronic data store;

receive first state information for an agent-controlled instance of the video game, wherein the agent-controlled instance of the video game is hosted by an imitation learning client computing system separate from the user computing system;

apply the first state information to the imitation learning model to obtain a first simulated user action, wherein the first state information is indicative of an execution state of the agent-controlled instance of the video game; and provide the first simulated action to an imitation learning agent configured to test the agent-controlled instance of the video game, wherein the imitation learning model comprises a dynamically generated imitation learning model that is updated during execution of the agent-controlled instance of the video game based on a user interaction with the user-controlled instance of the video game.

14. The system of claim 13, wherein the test system comprises the imitation learning client computing system.

15. The system of claim 13, wherein the hardware processor is further configured to execute specific computer-executable instructions to at least:

receive an updated imitation learning model;

receive second state information for the agent-controlled instance of the video game, wherein the second state information is received later than the first state information;

apply the second state information to the updated imitation learning model to obtain a second simulated user action; and provide the second simulated user action to the imitation learning agent to perform the second simulated user action with respect to the agent-controlled instance of the video game.

16. The system of claim 13, wherein the imitation learning agent is hosted by the imitation learning client computing system comprising computer hardware that is separate from the test system.

17. The system of claim 13, wherein the hardware processor is further configured to execute specific computer-executable instructions to at least:

receive an indication of the user interaction performed with respect to the user-controlled instance of the video game; and modify the imitation learning model of the video game based at least in part on the indication of the user interaction to obtain an updated imitation learning model.

18. The system of claim 17, wherein the hardware processor is further configured to execute specific computer-executable instructions to at least:

receive second state information for the agent-controlled instance of the video game, wherein the second state information is received later than the first state information;

apply the second state information to the updated imitation learning model to obtain a second simulated user action; and provide the second simulated user action to the imitation learning agent to perform the second simulated user action with respect to the agent-controlled instance of the video game.

19. The system of claim 13, wherein the hardware processor is further configured to execute specific computer-executable instructions to at least:

detect a trigger condition at the agent-controlled instance of the video game;

pause execution of the agent-controlled instance of the video game; and prompt a user to assume control of the agent-controlled instance of the video game.

20. The system of claim 19, wherein the hardware processor is further configured to execute specific computer-executable instructions to at least modify the imitation learning model of the video game based at least in part on user interaction with the agent-controlled instance of the video game.

* * * * *